(12) United States Patent
Lu et al.

(10) Patent No.: US 9,386,013 B2
(45) Date of Patent: Jul. 5, 2016

(54) DYNAMIC PASSWORD AUTHENTICATION METHOD AND SYSTEM THEREOF

(75) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 271 days.

(21) Appl. No.: 13/806,298

(22) PCT Filed: Dec. 27, 2011

(86) PCT No.: PCT/CN2011/084750
§ 371 (c)(1), (2), (4) Date: Dec. 21, 2012

(87) PCT Pub. No.: WO2013/075380
PCT Pub. Date: May 30, 2013

(65) Prior Publication Data
US 2014/0082709 A1    Mar. 20, 2014

(51) Int. Cl.
H04L 29/06    (2006.01)
G06F 21/36    (2013.01)
H04L 9/32    (2006.01)

(52) U.S. Cl.
CPC ............ *H04L 63/0838* (2013.01); *G06F 21/36* (2013.01); *H04L 9/3228* (2013.01); *G06F 2221/2103* (2013.01)

(58) Field of Classification Search
CPC ......... G06F 21/30; G06F 21/31; G06F 21/36; G06F 2221/2103; H04L 63/08; H04L 63/083; H04L 63/0838; H04L 63/0846; H04L 9/3228
USPC ................... 726/2–7; 713/182–184
See application file for complete search history.

(56) References Cited

U.S. PATENT DOCUMENTS

| | | |
|---|---|---|
| 6,738,392 B1 | 5/2004 | Thurston |
| 2004/0161111 A1* | 8/2004 | Sherman ................ 380/283 |

(Continued)

FOREIGN PATENT DOCUMENTS

| | | |
|---|---|---|
| CN | 1992592 A | 7/2007 |
| CN | 101051908 A | 10/2007 |

(Continued)

OTHER PUBLICATIONS

PCT/CN2011/084750 International Search Report.

*Primary Examiner* — Joseph P Hirl
*Assistant Examiner* — Thomas Gyorfi
(74) *Attorney, Agent, or Firm* — Fay Sharpe LLP

(57) ABSTRACT

The present invention discloses a dynamic password authentication method and a system thereof. The method comprises: a server receives first information sent from the client, generates second information according to the first information, sets every transmission bit in the second information to be in corresponding brightness status or color status to obtain a third information and sends it to a client; the client transforms the third information into impulse optical signal and outputs it; a dynamic password device transforms the impulse optical signal into intermediate information, extracts part or all of it and transforms it into display information; the dynamic password device receives trigger information, generates a first dynamic password; the server generates a second dynamic password or a set of second dynamic passwords and verifies whether the first dynamic password is legitimate by it. Security of authentication is improved by the present invention.

21 Claims, 13 Drawing Sheets

(56) References Cited

U.S. PATENT DOCUMENTS

| | | |
|---|---|---|
| 2006/0107063 A1* | 5/2006 | Fiske .................. 713/184 |
| 2007/0033649 A1* | 2/2007 | Henriksen ............ 726/20 |
| 2007/0130463 A1* | 6/2007 | Law et al. ............ 713/168 |
| 2007/0220594 A1* | 9/2007 | Tulsyan .................. 726/5 |
| 2008/0216152 A1* | 9/2008 | Traore et al. ........... 726/2 |
| 2010/0325433 A1* | 12/2010 | Jorgensen ............ 713/168 |

FOREIGN PATENT DOCUMENTS

| | | |
|---|---|---|
| CN | 101163014 A | 4/2008 |
| CN | 101699892 A | 4/2010 |
| CN | 102075547 A | 5/2011 |
| CN | 102509037 A | 6/2012 |

\* cited by examiner

DYNAMIC PASSWORD AUTHENTICATION METHOD AND SYSTEM THEREOF

FIELD OF THE INVENTION

The present invention relates to the field of information security, and more particularly, relates to a dynamic password authentication method and a system thereof.

BACKGROUND OF THE INVENTION

OTP (one time password), also called "dynamic password", is an unpredictable combination of random numbers generated according to a specialized algorithm. It can be used as a valid password only for one time. OTP is widely used in many application fields such as online bank, online video game, telecommunication, e-governmental administration, enterprise office work, etc.

The dynamic password token is a safe and convenient anti-theft technology for various accounts. For example, during an online transaction, a dynamic password token accordingly provided by the bank can be used to effectively protect the safety of the transaction and the logon verification. In addition, when dynamic password is used, it does not need to modify password regularly, which is safe and convenient, and especially useful for the internal application of enterprises or institutions. Due to the maturity of the short message gateway technology, it is easy to maintain the dynamic password, which reduces the complication and risk of the short message password system. Low cost of post-sale customer service and stable system of the short message password service enhances the security of the system and creates good reputation as well. That is an important reason for banks to adapt such technology widely at present. Currently, dynamic password token is the safest way for identification authentication. Dynamic password token based on time synchronization is most widely used, which generally generates an OTP with 6 digits every 60 seconds and the OTP is valid for only one time.

In the related art, dynamic password token of challenge/response type is the safest. However, generally a challenge code needs to be input manually. Manual input is very likely to cause mistakes, and therefore waste of time.

For the problem in related art that the authentication data is input manually in the dynamic password authentication method, which causes false authentication results and high cost of time and labor, no effective solution is provided at present.

SUMMARY OF THE INVENTION

For the problem in related art that the authentication data is input manually in the dynamic password authentication method, which causes false authentication results and high cost of time and labor, no effective solution is provided at present. The present invention provides a dynamic password authentication method and system to solve the problem above.

In order to achieve the purpose above and according to one aspect of the present invention, a dynamic password authentication method is provided. The dynamic password authentication method comprises: a server receiving first information sent by a client, and generating second information according to the first information; the server setting every transmission bit in the second information to be in corresponding brightness status or color status to obtain third information, and sending the third information to the client, wherein the third information comprises blinking information of impulse optical signal or image information of dynamic impulse optical signal; the client transforming the third information into an impulse optical signal and outputting the impulse optical signal; a dynamic password device receiving and identifying the impulse optical signal, transforming the impulse optical signal into intermediate information, extracting part or all of the intermediate information, transforming the part or all of the intermediate information into display information for a user to view, and outputting the display information; the dynamic password device receiving trigger information, and generating a first dynamic password according to the intermediate information; the client receiving the first dynamic password input by the user, and sending the first dynamic password to the server; and the server generating a second dynamic password or a set of second dynamic passwords, and verifying whether the first dynamic password is legitimate by the second dynamic password or the set of second dynamic passwords; if the first dynamic password is identical to the second dynamic password or any second dynamic password in the set of second dynamic passwords, verifying the first dynamic password to be legitimate; and if the first dynamic password is not identical to the second dynamic password or any second dynamic password in the set of second dynamic passwords, verifying the first dynamic password to be illegitimate.

Furthermore, the server setting every transmission bit in the second information to be in corresponding brightness status or color status to obtain the third information comprises: the server controlling the brightness status or the color status of the every transmission bit in the second information in a predetermined area according to control signal to obtain the blink information of impulse optical signal; or the server controlling the brightness status or the color status of the every transmission bit in the second information in different areas according to control signal to obtain the image information of dynamic impulse optical signal.

Furthermore, the dynamic password device receiving and identifying the impulse optical signal, and transforming the impulse optical signal into intermediate information comprises: A. acquiring the impulse optical signal in a predetermined area; B. receiving and identifying a byte of data in the impulse optical signal; C. determining whether the byte of data is header information; if the byte of data is header information, performing D; and if the byte of data is not header information, going back to B; D. receiving and identifying the impulse optical signal representing a predetermined number of bytes of data after the header information, and transforming and combining the header information and the predetermined number of bytes of data to obtain a set of combined intermediate information; and E. after receiving all of the combined intermediate information, combining all of the combined intermediate information to generate the intermediate information.

Furthermore, the dynamic password device receiving and identifying the impulse optical signal, and transforming the impulse optical signal into intermediate information comprises: acquiring the impulse optical signal in a predetermined area; receiving and identifying all bytes of data in the impulse optical signal; combining all bytes of data representing the header information and a predetermined number of bytes of data after the header information to obtain all of combined intermediate information; and combining all of the combined intermediate information to generate the intermediate information.

Furthermore, before combining all of the combined intermediate information to generate the intermediate information, the method further comprises: the dynamic password device determining whether all of the received combined intermediate information is correct in a predetermined time; if all of the received combined intermediate information is determined to be correct in the predetermined time, combining all of the combined intermediate information to generate the intermediate information; and if any information in all of the received combined intermediate information is determined to be incorrect in the predetermined time, the dynamic password device outputting a message of error; wherein the dynamic password device determining whether all of the received combined intermediate information is correct in the predetermined time comprises: the dynamic password device determining whether the received combined intermediate information is correct; if the combined intermediate information is correct, the dynamic password device determining whether all of the combined intermediate information which is determined to be correct is received; if all of the combined intermediate information which is determined to be correct is received, the dynamic password device combining all of the combined information which is determined to be correct; and if all the combined intermediate information which is determined to be correct is not received, going back to B; and if the combined intermediate information is not correct, determining whether the predetermined time is reached, if the predetermined time is reached, the dynamic password device outputting a message of error; and if the predetermined time is not reached, going back to B.

Furthermore, before combining all of the combined intermediate information to generate the intermediate information, the method further comprises: the dynamic password device determining whether all of the received combined intermediate information is correct in a predetermined time; if all of the received combined intermediate information is determined to be correct in the predetermined time, combining all of the combined intermediate information to generate the intermediate information; and if any information in all received combined intermediate information is determined to be incorrect in the predetermined time, the dynamic password device outputting a message of error; wherein the dynamic password device determining whether all of the received combined intermediate information is correct in the predetermined time comprises: a. determining whether all of the combined intermediate information is correct one by one; if every set of the combined intermediate information is correct, performing b; and if at least one set of the combined intermediate information is incorrect, performing c; b. the dynamic password device combining all of the received intermediate information to generate the intermediate information; and c. the dynamic password device determining whether the predetermined time is reached, if the predetermined time is reached, outputting a message of error; and if the predetermined time is not reached, continuing receiving the combined intermediate information which has not been determined, and performing a.

Furthermore, the dynamic password device receiving the trigger information, and generating the first dynamic password according to the intermediate information comprises: performing encryption computation on the intermediate information and a pre-stored first static factor to obtain the first dynamic password; or performing encryption computation on the intermediate information, an additional dynamic factor and a pre-stored first static factor to obtain the first dynamic password.

Furthermore, generating the second information according to the first information comprises: extracting predetermined information from the first information, and taking the predetermined information as the second information; or extracting the predetermined information from the first information, and adding additional information into the predetermined information to generate the second information; or taking the first information as the second information directly.

In order to achieve the purpose above and according to another aspect of the present invention, a dynamic password authentication method is provided. The dynamic password authentication method comprises: a server receiving first information sent by a client, and generating second information according to the first information; the server sending the second information to the client; and the client receiving the second information and setting every transmission bit in the second information to be in corresponding brightness status or color status to obtain third information, wherein the third information comprises blinking information of impulse optical signal or image information of dynamic impulse optical signal; the client transforming the third information into an impulse optical signal and outputting the impulse optical signal; a dynamic password device receiving and identifying the impulse optical signal, transforming the impulse optical signal into intermediate information, extracting part or all of the intermediate information, transforming the part or all of the intermediate information into display information for a user to view, and outputting the display information; the dynamic password device receiving trigger information, and generating a first dynamic password according to the intermediate information; the client receiving the first dynamic password input by the user, and sending the first dynamic password to the server; and the server generating a second dynamic password or a set of second dynamic passwords, and verifying whether the first dynamic password is legitimate by the second dynamic password or the set of second dynamic passwords; if the first dynamic password is identical to the second dynamic password or any second dynamic password in the set of second dynamic passwords, verifying the first dynamic password to be legitimate; and if the first dynamic password is not identical to the second dynamic password or any second dynamic password in the set of second dynamic passwords, verifying the first dynamic password to be illegitimate.

Furthermore, the client receiving the second information and setting the every transmission bit in the second information to be in corresponding brightness status or color status to obtain the third information comprises: after receiving the second information, the client controlling the brightness status or the color status of the every transmission bit in the second information in a predetermined area according to a control signal to obtain the blinking information of impulse optical signal; or after receiving the second information, the client controlling the brightness status or the color status of the every transmission bit in the second information in different areas according to a control signal to obtain the image information of dynamic impulse optical signal.

Furthermore, the dynamic password device receiving and identifying the impulse optical signal and transforming the impulse optical signal into the intermediate information comprises: A. acquiring the impulse optical signal in a predetermined area; B. receiving and identifying a byte of data in the impulse optical signal; C. determining whether the byte of data is header information; if the byte of data is header information, performing D; and if the byte of data is not header information, going back to B; D. receiving and identifying impulse optical signal representing a predetermined number of bytes of data after the header information, and transforming and combining the header information and the predetermined number of the bytes of data to obtain a set of combined intermediate information; and E. after receiving all of the combined intermediate information, combining all of the combined intermediate information to generate the intermediate information.

Furthermore, the dynamic password device receiving and identifying the impulse optical signal and transforming the impulse optical signal into the intermediate information comprises: acquiring the impulse optical signal in a predetermined area; receiving and identifying all bytes of data in the impulse optical signal; combining the byte of data representing the header information and a predetermined number of bytes of data after the header information to obtain all of the combined intermediate information; and combining all of the combined intermediate information to generate the intermediate information.

Furthermore, before combining all of the intermediate information to generate the intermediate information, the method further comprises: the dynamic password device determining whether all of the received combined intermediate information is correct in a predetermined time; if all of the received combined intermediate information is determined to be correct in the predetermined time, combining all of the combined intermediate information to generate the intermediate information; and if any information in the all of the received intermediate information is determined to be incorrect in a predetermined time, the dynamic password device outputting a message of error, wherein the dynamic password device determining whether all of the received combined intermediate information is correct in a predetermined time comprises: the dynamic password device determining whether the received combined intermediate information is correct; if the combined intermediate information is correct, the dynamic password device determining whether all of the combined intermediate information which is determined to be correct is received; if the all of the combined intermediate information which is determined to be correct is received, the dynamic password device combining all of the combined information which is determined to be correct; and if not the all of the combined intermediate information which is determined to be correct is received, going back to B; if the combined intermediate information is not correct, determining whether the predetermined time is reached; if the predetermined time is reached, the dynamic password device outputting a message of error; and if the predetermined time is not reached, going back to B.

Furthermore, before combining all of the combined intermediate information to generate the intermediate information, the method comprises: the dynamic password device determining whether all of the received combined intermediate information is correct in a predetermined time; if the all of the received combined intermediate information is determined to be correct in the predetermined time, combining all of the combined intermediate information to generate the intermediate information; and if any information in the all of the received combined intermediate information is determined to be incorrect in the predetermined time, the dynamic password device outputting a message of error, wherein the dynamic password device determining whether all of the received combined intermediate information is correct in the predetermined time comprises: a. determining, whether all of the combined intermediate information is correct one by one; if every set of combined intermediate information is correct, performing b; and if at least one set of the combined intermediate information is incorrect, performing c; b. the dynamic password device combining the all of the received combined intermediate information to generate the intermediate information; and c. the dynamic password device determining whether the predetermined time is reached; if the predetermined time is reached, outputting a message of error; and if the predetermined time is not reached, continuing receiving the combined intermediate information which has not been determined, and performing a.

Furthermore, the dynamic password device receiving the trigger information, and generating the first dynamic password according to the intermediate information comprises: performing encryption computation on the intermediate information and a pre-stored first static factor to obtain the first dynamic password; or performing encryption computation on the intermediate information, an additional dynamic factor and a pre-stored first static factor to obtain the first dynamic password.

Furthermore, generating the second information according to the first information comprises: extracting predetermined information from the first information, and taking the predetermined information as the second information; or extracting the predetermined information from the first information, and adding additional information into the predetermined information to generate the second information; or taking the first information as the second information directly.

In order to achieve the purpose above and according to another aspect of the present invention, a dynamic password authentication method is provided. The dynamic password authentication method comprises: a client receiving first information and generating second information according to the first information; the client setting every transmission bit in the second information to be in corresponding brightness status or color status to obtain third information, wherein the third information comprises blinking information of impulse optical signal or image information of dynamic impulse optical signal; the client transforming the third information into an impulse optical signal, and outputting the impulse optical signal; a dynamic password device receiving the impulse optical signal, transforming the impulse optical signal into intermediate information, extracting part or all of the intermediate information, transforming the part or all of the intermediate information into display information for a user to view, and outputting the display information; the dynamic password device receiving trigger information, and generating a first dynamic password according to the intermediate information; the client receiving the first dynamic password input by the user, and sending the first dynamic password and the second information to the server; the server generating a second dynamic password or a set of second dynamic passwords, and verifying whether the first dynamic password is legitimate by the second dynamic password or the set of second dynamic passwords; if the first dynamic password is identical to the second dynamic password or any second dynamic password in the set of the second dynamic passwords, verifying the first dynamic password to be legitimate; and if the first dynamic password is not identical to the second dynamic password or any second dynamic password in the set of the second dynamic passwords, verifying the first dynamic password to be illegitimate.

Furthermore, the client setting every transmission bit in the second information to be in corresponding brightness status or color status to obtain the third information comprises: the client controlling the brightness status or the color status of the every transmission bit in the second information in a predetermined area according to a control signal to obtain the blinking information of impulse optical signal; or the client controlling the brightness status or the color status of the every transmission bit in the second information in different areas according to a control signal to obtain the image information of dynamic impulse optical signal.

Furthermore, the dynamic password device receiving the impulse optical signal and transforming the impulse optical signal into the intermediate information comprises: A'. acquiring the impulse optical signal in a predetermined area; B'. receiving and identifying a byte of data in the impulse optical signal; C'. determining whether the byte of data is header information; if the byte of data is header information, performing D'; if the byte of data is not header information, going back to B'; D'. receiving and identifying impulse optical signal representing a predetermined number of bytes of data after the header information, transforming and combining the header information and the predetermined number of the bytes of data to obtain a combined intermediate information; and E'. after receiving all of the combined intermediate information, combining the all of the combined intermediate information to generate the intermediate information.

Furthermore, the dynamic password device receiving the impulse optical signal and transforming the impulse optical signal into the intermediate information comprises: acquiring the impulse optical signal in a predetermined area; receiving and identifying all bytes of data in the impulse optical signal; combining the byte of data representing header information and a predetermined number of bytes of data after the header information to obtain all of the combined intermediate information; and combining the all of the combined intermediate information to generate the intermediate information.

Furthermore, before combining all of the intermediate information to generate the intermediate information, the method further comprises: the dynamic password device determining whether all of the received combined intermediate information is correct in a predetermined time; if the all of the received combined intermediate information is determined to be correct in the predetermined time, combining all of the combined intermediate information to generate the intermediate information; and if any information in the all of the received intermediate information is determined to be incorrect in the predetermined time, the dynamic password device outputting a message of error, wherein the dynamic password device determining whether all of the received combined intermediate information is correct in the predetermined time comprises: the dynamic password device determining whether the received combined intermediate information is correct; if the combined intermediate information is correct, the dynamic password device determining whether all of the combined intermediate information which is determined to be correct is received; if all of the combined intermediate information which is determined to be correct is received, the dynamic password device combining all of the combined information which is determined to be correct; and if not all of the combined intermediate information which is determined to be correct is received, going back to B'; and if the combined intermediate information is not correct, determining whether the predetermined time is reached; if the predetermined time is reached, the dynamic password device outputting a message of error; and if the predetermined time is not reached, going back to B'.

Furthermore, before combining all of the intermediate information to generate the intermediate information, the method further comprises: the dynamic password device determining whether all of the received combined intermediate information is correct in a predetermined time; if the all of the received combined intermediate information is determined to be correct in the predetermined time, combining all of the combined intermediate information to generate the intermediate information; and if any information in the all of the received combined intermediate information is determined to be incorrect in the predetermined time, the dynamic password device outputting a message of error, wherein the dynamic password device determining whether all of the received combined intermediate information is determined to be correct in the predetermined time comprises: a'. the dynamic password device determining whether all of the combined intermediate information is correct one by one; if every set of the combined intermediate information is correct, performing b'; and if at least one set of the combined intermediate information is incorrect, performing c'; b'. the dynamic password device combining the all of the received combined intermediate information to generate the combined intermediate information; and c'. the dynamic password device determining whether the predetermined time is reached; if the predetermined time is reached, outputting a message of error; and if the predetermined time is not reached, continuing receiving the rest of the combined intermediate information which has not been determined, and performing a'.

Furthermore, the dynamic password device receiving the trigger information, and generating the first dynamic password according to the intermediate information comprises: performing encryption computation on the intermediate information and a pre-stored first static factor to obtain the first dynamic password; or performing encryption computation on the intermediate information, an additional dynamic factor and a pre-stored first static factor to obtain the first dynamic password.

Furthermore, generating the second information according to the first information comprises: extracting predetermined information from the first information, and taking the predetermined information as the second information; or extracting the predetermined information from the first information, and adding additional information into the predetermined information to generate the second information; or taking the first information as the second information directly.

In order to achieve the purpose above and according to one aspect of the present invention, a dynamic password authentication system is provided. The dynamic password authentication system comprises a server, a client and a dynamic password device, wherein the server is configured to receive first information and a first dynamic password sent from the client, generate second information according to the first information, set every transmission bit in the second information to be in corresponding brightness status and color status to obtain third information, and send the third information to the client; and generate a second dynamic password or a set of second dynamic passwords according to the second information and verify whether the first dynamic password is legitimate by the second dynamic password or the set of second dynamic passwords; the client is configured to send the first information and the first dynamic password to the server, receive the third information sent by the server, transform the third information into an impulse optical signal, and output the impulse optical signal; and the dynamic password device is configured to receive the impulse optical signal and trigger information output by the client, identify the impulse optical signal and transform the impulse optical signal into intermediate information, and generate the first dynamic password according to the intermediate information; and after extracting part or all of the intermediate information, transform the extracted information into display information for a user to view, and output the display information transformed by an extraction module and the first dynamic password.

In order to achieve the purpose above and according to another aspect of the present invention, a dynamic password authentication system is provided. The dynamic password authentication system comprises a server, a client and a dynamic password device, wherein the server is configured to receive first information and a first dynamic password sent from the client, generate second information according to the first information, generating a second dynamic password or a set of second dynamic passwords according to the second information, verifying whether the first dynamic password is legitimate by the second dynamic password or the set of second dynamic passwords, and sending the second information to the client; the client is configured to send the first information and the first dynamic password to the server; receiving the second information sent by the server, set every transmission bit in the second information to be in corresponding brightness status or color status to obtain third information, transform the third information into an impulse optical signal, and output the impulse optical signal; and the dynamic password device is configured to receive the impulse optical signal and trigger information output from the client, identify and transform the impulse optical signal into intermediate information, and generate the first dynamic password according to the intermediate information; and after extracting part or all of the intermediate information, transform the extracted information into display information for a user to view, and output the display information transformed by an extraction module and the first dynamic password.

In order to achieve the purpose above and according to another aspect of the present invention, a dynamic password authentication system is provided. The dynamic password authentication system comprises a server, a client and a dynamic password device, wherein the server is configured to receive a first dynamic password and second information sent from the client, generate a second dynamic password or a set of second dynamic passwords according to the second information, and verify whether the first dynamic password is legitimate by the second dynamic password or the set of dynamic passwords; the client is configured to receive first information and the first dynamic password input by the user, generate the second information according to the first information, send the second information and the first dynamic password to the server, set every transmission bit in the second information to be in corresponding brightness status or color status to obtain third information, and then transform the third information into an impulse optical signal and output the impulse optical signal; and the dynamic password device is configured to receive the impulse optical signal and trigger information, identify and transform the received impulse optical signal into intermediate information, and generate the first dynamic password according to the intermediate information; and after extracting part or all of the intermediate information, transform the extracted information into display information for a user to view, and output the display information transformed by an extraction module and the first dynamic password.

The present invention employs the solution that a server receives a first information sent from the client, generates a second information according to the first information, sets every transmission bit in the second information to be in corresponding brightness status or color status to obtain a third information, and sends the third information to a client; or, the server sends the second information to the client, the client receives the second information and sets every transmission bit in the second information to be in corresponding brightness status or color status to obtain the third information; the client transforms the third information into impulse optical signal and outputs the impulse optical signal; when a dynamic password device receives impulse optical signal, the dynamic password device transforms the impulse optical signal into intermediate information, extracts part or all of the intermediate information and transforms the extracted information into a display information for a user to view; the dynamic password device receives a trigger information, generates a first dynamic password according to the intermediate information; the client receives the first dynamic password input by the user and sends the first dynamic password to the server; the server generates a second dynamic password or a set of second dynamic passwords according to the second information and verifies whether the first dynamic password is legitimate by the second dynamic password or the set of second dynamic passwords; and the server performs user operation if the first dynamic password is correct. The present invention solves the problems in the related art that in the dynamic password authentication method the authentication data is input manually, which causes false authentication result and high cost of time and labor. Thus, the present invention realizes cost reduction and improves the security of the authentication.

BRIEF DESCRIPTION OF THE DRAWINGS

The drawings hereby described provide a further understanding of the present invention and constitute a part of the present application. The exemplary embodiments and its description are intended for explanation of the present invention, and do not constitute undue limitation to the present invention. In the drawings.

DETAILED DESCRIPTION OF THE EMBODIMENTS

It should be noted that, if there is no conflict, the embodiments and the features of the embodiments in the present invention can be combined with each other. The present invention is described hereinafter in detail, with reference to the drawings and in combination with the embodiments.

Embodiment 1

Figure 1A:
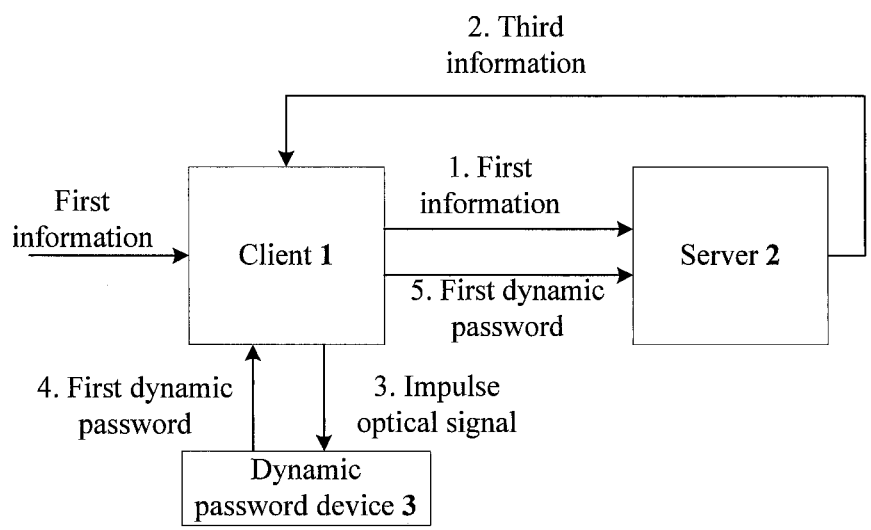
FIG. 1a-FIG. 1b are schematic diagrams illustrating signal transmission of a dynamic password authentication system according to Embodiment 1 of the present invention.
Figure 1B:
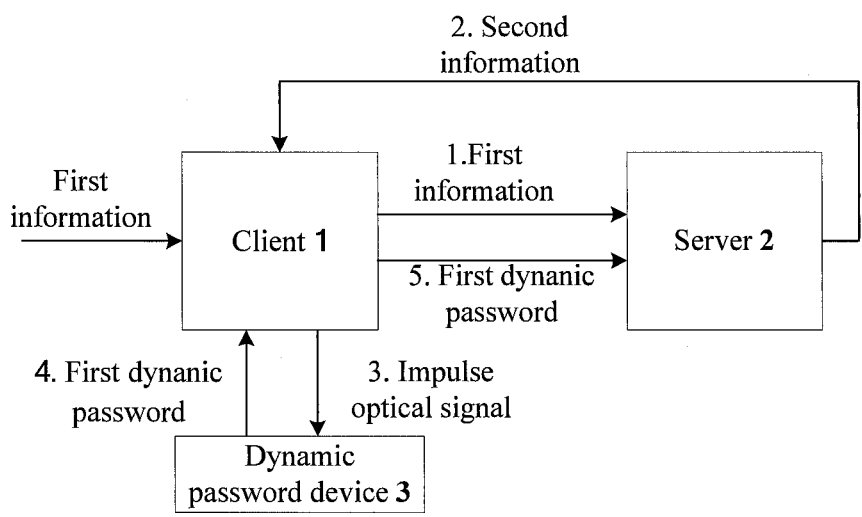

FIG. 1a-FIG. 1b are schematic diagrams illustrating signal transmission of a dynamic password authentication system according to Embodiment 1 of the present invention.

As shown in FIG. 1a, the dynamic password authentication system includes: a server 2, for receiving a first information sent from a client 1, generating a second information according to the first information and setting every transmission bit in the second information to be in corresponding brightness status or color status to obtain a third information which includes blinking information of impulse optical signal or image information of dynamic impulse optical signal; client 1, for receiving the first information, sending the first information to the server, transforming the third information received from server 2 into impulse optical signal, and outputting the impulse optical signal; and a dynamic password device 3, for receiving the impulse optical signal, transforming the received impulse optical signal to intermediated information, extracting and transforming part or all of the intermediate information into display information for a user to view and generating a first dynamic password according to the intermediate information. In this case, client 1 receives the first dynamic password input by the user and transfers the first dynamic password to server 2, and server 2 verifies whether the first dynamic password is legitimate, and if the first dynamic password is legitimate, server 2 performs user operation.

In the dynamic password authentication system of the above embodiment of the present invention, client 1 sends user information to server 2, server 2 transforms the user information into impulse optical signal according to a predetermined transforming way, and sends the impulse optical signal to client 1, client 1 outputs the impulse optical signal, and dynamic password device 3 acquires the impulse optical signal, generates the dynamic password, and sends the dynamic password to server 2 for verification.

As shown in FIG. 1b, the dynamic password authentication system includes: server 2, for receiving the first information sent from client 1, generating the second information according to the first information, and sending the second information to client 1; client 1, for receiving the first information, sending the first information to server 2, setting every transmission bit in the second information received from server 2 to be in corresponding brightness status or color status to obtain the third information which includes blinking information of impulse optical signal or image information of dynamic impulse optical signal, and transforming the third information into impulse optical signal and outputting the impulse optical signal; and a dynamic password device 3, for receiving the impulse optical signal, transforming the received impulse optical signal into intermediate information, extracting and transforming part or all of the intermediate information into the display information for the user to view, and generating the first dynamic password according to the intermediate information. In this case, client 1 receives the first dynamic password input by the user and transfers the received first dynamic password to server 2, and server 2 verifies whether the first dynamic password is legitimate, and if the first dynamic password is legitimate, server 2 performs user operation.

In the dynamic password authentication system of the above embodiment of the present invention, client 1 sends user information to server 2, server 2 transforms the user information into the second information and sends the second information back to client 1, client 1 transforms the second information into impulse optical signal according to a predetermined transforming way and outputs the impulse optical signal, and dynamic password device 3 acquires impulse optical signal, generates the dynamic password and sends the dynamic password to server 2 for verification.

The above embodiments adapt a transmission method without wired connection to transfer related user information to dynamic password device 3, which omits the step of manual input adapted by the related art and increases transmission efficiency of a large quantity of data. Specifically, when the technical solutions of the embodiments are applied in online transaction, client 1 transfers related user information to dynamic password device 3 by the transmission method without wired connection and generates a corresponding dynamic password. The dynamic password is used for comparison with a dynamic password generated by server 2, which improves security. In Embodiment 1, server 2 processes the first signal, while client 1 mostly performs the function of transferring. Dynamic password device 3 in the embodiment needs user information as a dynamic factor to participate in generating a dynamic password.

Embodiment 2

Figure 2:
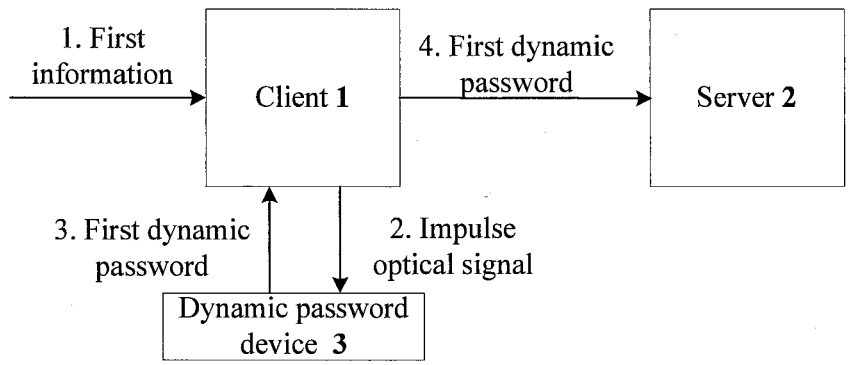
FIG. 2 is a schematic diagram illustrating signal transmission of a dynamic password authentication system according to Embodiment 2 of the present invention.

FIG. 2 is a schematic diagram illustrating signal transmission of a dynamic password authentication system according to Embodiment 2 of the present invention. As shown in FIG. 2, the dynamic password authentication system of the present invention can be implemented in another way. The system includes: client 1, for receiving the first information, generating the second information according to the first information and setting every transmission bit in the second information to be in corresponding brightness status and color status to obtain the third information which includes blinking information of impulse optical signal or image information of the dynamic impulse optical signal; and the dynamic device 3, for receiving and transforming the impulse optical signal into intermediate information, extracting and transforming part or all of the intermediate information into display information for the user to view, and sending the first dynamic password generated according to the intermediate information back to client 1. In this case, client 1 receives the first dynamic password input by the user and sends the first dynamic password to server 2, server 2 verifies whether the first dynamic password is legitimate, and if the first dynamic password is legitimate, server 2 performs user operation.

The dynamic password authentication system of the above embodiment of the present invention adapts a transmission method without wired connection to transfer related user information to dynamic password device 3, which omits the step of manual input adapted by the related art and increases transmission efficiency of a large quantity of data. Specifically, when the technical solution of the embodiment is applied in online transaction, the related user information is transferred to dynamic password device 3 by the transmission method without wired connection and generates a corresponding dynamic password. The dynamic password is used for comparison with a dynamic password generated by server 2, which improves security. Dynamic password device 3 in the embodiment needs user information as a dynamic factor to participate in generating a dynamic password.

Client 1 of Embodiment 2 completes the process of transforming the first information. Compared with Embodiment 1, the work load of server 2 is reduced, which relatively improves working efficiency.

Embodiment 3

Figure 3:
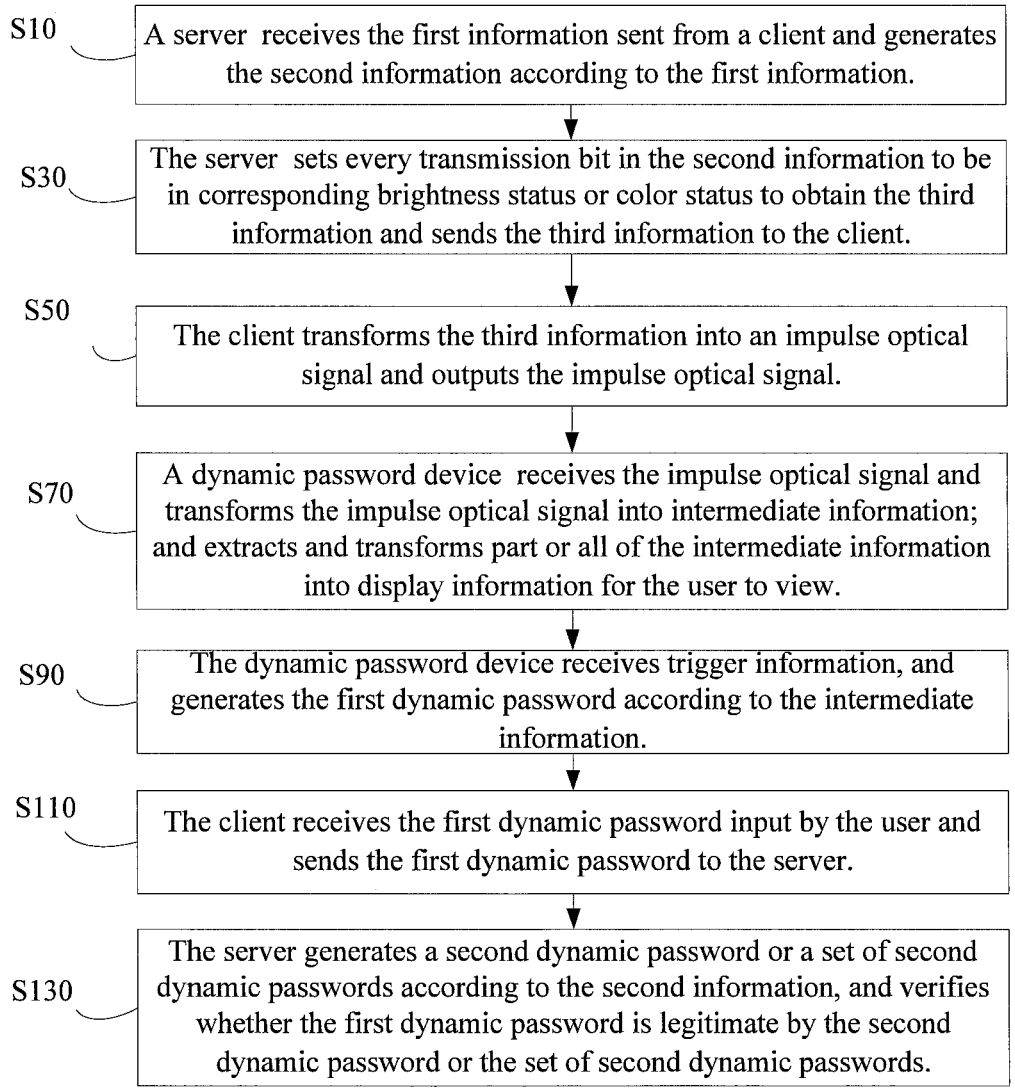
FIG. 3 is a flow chart illustrating a dynamic password authentication method according to Embodiment 3 of the present invention.

FIG. 3 is a flow chart illustrating a dynamic password authentication method according to Embodiment 3 of the present invention. As shown in FIG. 3, the method includes the following steps.

Step S10, server 2 receives the first information sent from client 1 and generates the second information according to the first information.

Step S30, server 2 sets every transmission bit in the second information to be in corresponding brightness status or color status to obtain the third information and sends the third information to client 1; the third information includes blinking information of impulse optical signal or image information of dynamic impulse optical signal; or server 2 sends the second information to client 1, and client 1 receives the second information and sets every transmission bit in the second information to be in corresponding brightness status or color status to obtain the third information; the third information includes blinking information of impulse optical signal or the image information of dynamic impulse optical signal;

Step S50, client 1 transforms the third information into an impulse optical signal and outputs the impulse optical signal.

Step S70, when dynamic password device 3 receives the impulse optical signal, and dynamic password device 3 transforms the impulse optical signal into intermediate information; and dynamic password device 3 extracts and transforms part or all of the intermediate information into display information for the user to view.

Step S90, dynamic password device 3 receives trigger information, and generates the first dynamic password according to the intermediate information.

Step S110, client 1 receives the first dynamic password input by the user and sends the first dynamic password to server 2.

Step S130, server 2 generates a second dynamic password or a set of second dynamic passwords according to the second information, and verifies whether the first dynamic password is legitimate by the second dynamic password or the set of second dynamic passwords;

if the first dynamic password is identical to the second dynamic password or any second password in the set of the second dynamic passwords, the first dynamic password is verified to be legitimate; and if the first dynamic password is not identical to the second dynamic password or any second password in the set of the second dynamic passwords, the first dynamic password is verified to be illegitimate.

The above embodiment of the present invention adapts a transmission method without wired connection to transfer related user information to dynamic password device 3, which omits the step of manual input applied in the related art and increases transmission efficiency of a large quantity of data. Specifically, when the technical solution of the embodiment is applied in online transaction, client 1 transfers related user information to dynamic password device 3 by the transmission method without wired connection and generates a corresponding dynamic password. The dynamic password is used for comparison with a dynamic password generated by server 2, which improves security. In above Embodiment 3, server 2 processes the first signal, while client 1 mostly performs the function of transferring. Dynamic password device 3 in the present invention needs user information as a dynamic factor to participate in generating a dynamic password.

Preferably, in step S30 of the above embodiment of the present invention, that server 2 sets every transmission bit in the second information to be in corresponding brightness status or color status to obtain the third information specifically includes that server 2 controls the brightness status or color status of every transmission bit in the second information in a predetermined area according to a control signal to obtain blinking information of impulse optical signal; or server 2 controls the brightness status or color status of every transmission bit in the second information in different areas according to a control signal to obtain image information of the dynamic impulse optical signal.

Preferably, when dynamic password device 3 receives the impulse optical signal, the step of transforming the impulse optical signal into intermediate information can include: A. acquiring the impulse optical signal at the predetermined outputting area; B. receiving and identifying one byte of data in the impulse optical signal; C. determining whether the byte of data is header information; if the byte of data is header information, performing D; and if the byte of data is not header information, returning back to B; D. receiving and identifying the impulse optical signal representing a predetermined number of bytes of data after the header information, transforming and combining the header information and the predetermined number of bytes of data to obtain a set of intermediate information; and E. receiving all sets of intermediate information and combining all sets of the intermediate information.

When dynamic password device 3 receives the impulse optical signal, another way of implementing the transforming the impulse optical signal into the intermediate information includes: acquiring the impulse optical signal in a predetermined outputting area; receiving and identifying all bytes of data of the impulse optical signal; combining all bytes of data representing the header information and a predetermined number of bytes of data subsequent header information to obtain a piece of new intermediate information; combining all of the new intermediate information to obtain a combined intermediate information; and combining all of the combined intermediate information to obtain the intermediate information.

Figure 4:
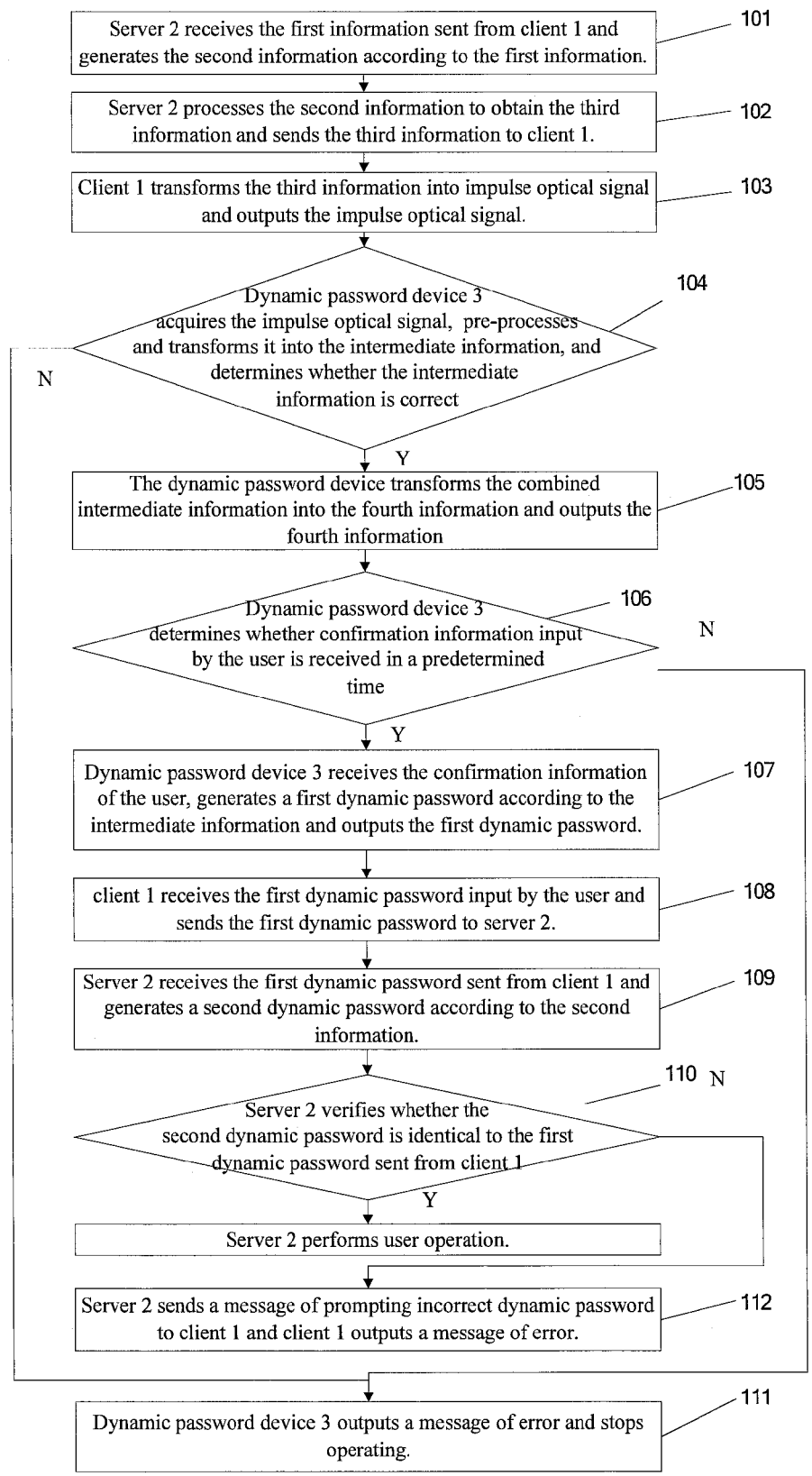
FIG. 4 is a flow chart illustrating a dynamic password authentication method based on the method shown in FIG. 3.

FIG. 4 is a flow chart illustrating a dynamic password authentication method based on the method shown in FIG. 3. As shown in FIG. 4, the embodiment provides a detailed dynamic password generation method, which specifically includes the following steps.

Step 101, server 2 receives the first information sent from client 1 and generates the second information according to the first information;

The first information in the embodiment includes user identification code, account information, amount and additional information, etc. The user identification code is for identifying a user and can be modified by the user; and the additional information is a set of information input by the user which can be character combination of any length.

In the embodiment, that server 2 generates the second information according to the first information specifically includes that:

server 2 extracts predetermined information from the first information according to a predetermined method and generates the second information according to the predetermined information.

For example, in the embodiment, the first information is <?xml version="1.0" encoding="UTF-8"?><T><D><M><k> the user identification code: </k><v>123456</v></M><M><k> the account information: </k><v>11112222</v></M><D><E><M><k> and the amount: </k><v>45600</v></M></E></T> user identification code: 123456;
account information: 11112222;
amount: 45600.

The first information can further include predetermined data such as time, place and password.

server 2 can take the predetermined information as the second information, or do not extract the predetermined information and take the first information as the second information; and further, server 2 can generate the second information by adding other information on the basis of predetermined information. Preferably, in the embodiment, server 2 extracts the predetermined information and adds the additional information in the predetermined information to obtain the second information. Correspondingly, the second information generated by server 2 includes:

user identification code: 123456;
account information: 11112222;
amount: 45600; and
additional information: 654321;

server 2 respectively transforms information in the second information according to different sets, and generates a general data packet which is specifically as the following:

a0 7 31 32 33 34 35 36 0 a1 9 31 31 31 31 32 32 32 32 9 a2 6 34 35 36 30 30 22 a3 7 36 35 34 33 32 31 22.

In the general data packet, a0, a1, a2 and a3 represent header information of data packets respectively. That a set of data has been received can be determined according to the header information.

In step 101 of the embodiment, the header information can be represented by characters which are not allowed in the ASCII table, avoiding the confusion with the transferred bytes of data.

Step 102, server 2 processes the second information to obtain the third information and sends the third information to client 1;

Alternatively, step 102 can be that server 2 sends the second information to client 1, and client 1 processes the second information to obtain the third information. The method that client 1 uses to process the second information to obtain the third information is the same as the method that server 2 uses to process the second information to obtain the third information.

Step 103, client 1 transforms the third information into impulse optical signal and outputs the impulse optical signal;

Step 104, dynamic password device 3 acquires the impulse optical signal, pre-processes and transforms the impulse optical signal into the intermediate information, and determines whether the intermediate information is correct; and the dynamic password device determines whether the received intermediate information is correct in a predetermined time;

if yes, go to step 105; and
if no, go to step 111.

Preferably, dynamic password device 3 receives the impulse optical signal by an illumination element. One or more illumination elements can be located on the dynamic password device. If more than one illumination elements are located on the dynamic password device, the forms of the arrangement of the illumination elements can include: arrangement in one line, arrangement in matrix, arrangement in circular, etc.

Step 105, the dynamic password device transforms the combined intermediate information into the fourth information and outputs the fourth information;

Specifically, the dynamic password device extracts and transforms part or all of the information in the intermediate information into decimal value as the fourth information. The fourth information is convenient for the user to view.

It should be noted that, in the present embodiment, the fourth information includes the user identification code, account information, amount and additional information of the user.

Step 106, dynamic password device 3 determines whether confirmation information input by the user is received in a predetermined time;

if yes, go to step 107; and
if no, go to step 111.

Preferably, in step 106 of the embodiment, the predetermined time is 60 seconds.

Step 107, dynamic password device 3 receives the confirmation information of the user, generates a first dynamic password according to the intermediate information and outputs the first dynamic password;

Specifically, the method that dynamic password device 3 generates a dynamic password can be that dynamic password device 3 takes the intermediate information as a first dynamic factor, and performs encryption computation on the first dynamic factor and a pre-stored first static factor using an inbuilt algorithm to generate the first dynamic password, and outputs the first dynamic password.

The method that dynamic password device 3 generates the dynamic password can also be that dynamic password device 3 takes the intermediate information as the first dynamic factor, performs encryption computation on the first dynamic factor, a current time factor (or a times factor) and a pre-stored first static factor using an inbuilt algorithm to generate the first dynamic password, and outputs the first dynamic password.

Step 108, client 1 receives the first dynamic password input by the user and sends the first dynamic password to server 2.

Step 109, server 2 receives the first dynamic password sent from client 1 and generates a second dynamic password according to the second information.

The method that server 2 generates the second dynamic password is identical to the method that dynamic password device 3 generates the first dynamic password in step 107.

Specifically, in the embodiment, server 2 takes the inbuilt second information as the second dynamic factor, performs encryption computation on the second dynamic factor and a pre-stored second static factor using an inbuilt algorithm to generate a second dynamic password.

Preferably, the second static factor pre-stored by server 2 is identical to the first static factor in dynamic password device 3.

Step 110, server 2 verifies whether the second dynamic password is identical to the first dynamic password sent from client 1;

if yes, perform user operation; and
if no, go to step 112.

Step 111, dynamic password device 3 outputs a message of error and stops operating Step 112, server 2 sends a message of prompting incorrect dynamic password to client 1 and client 1 outputs a message of error.

Preferably, in the embodiment, step 112 can also perform the following operation: server 2 sends a message of prompting incorrect dynamic password to client 1, and client 1 prompts the user to input a dynamic password again.

In the embodiment, the second dynamic password can further record the time of generating the impulse optical signal in step 102; and correspondingly, server 2 calculates the time difference between the time of receiving the first dynamic password and the time of the generating the impulse optical signal, and determines whether the time difference is in a range of a predetermined time difference; and if yes, go to step 110; otherwise, go to step 111.

Figure 5:
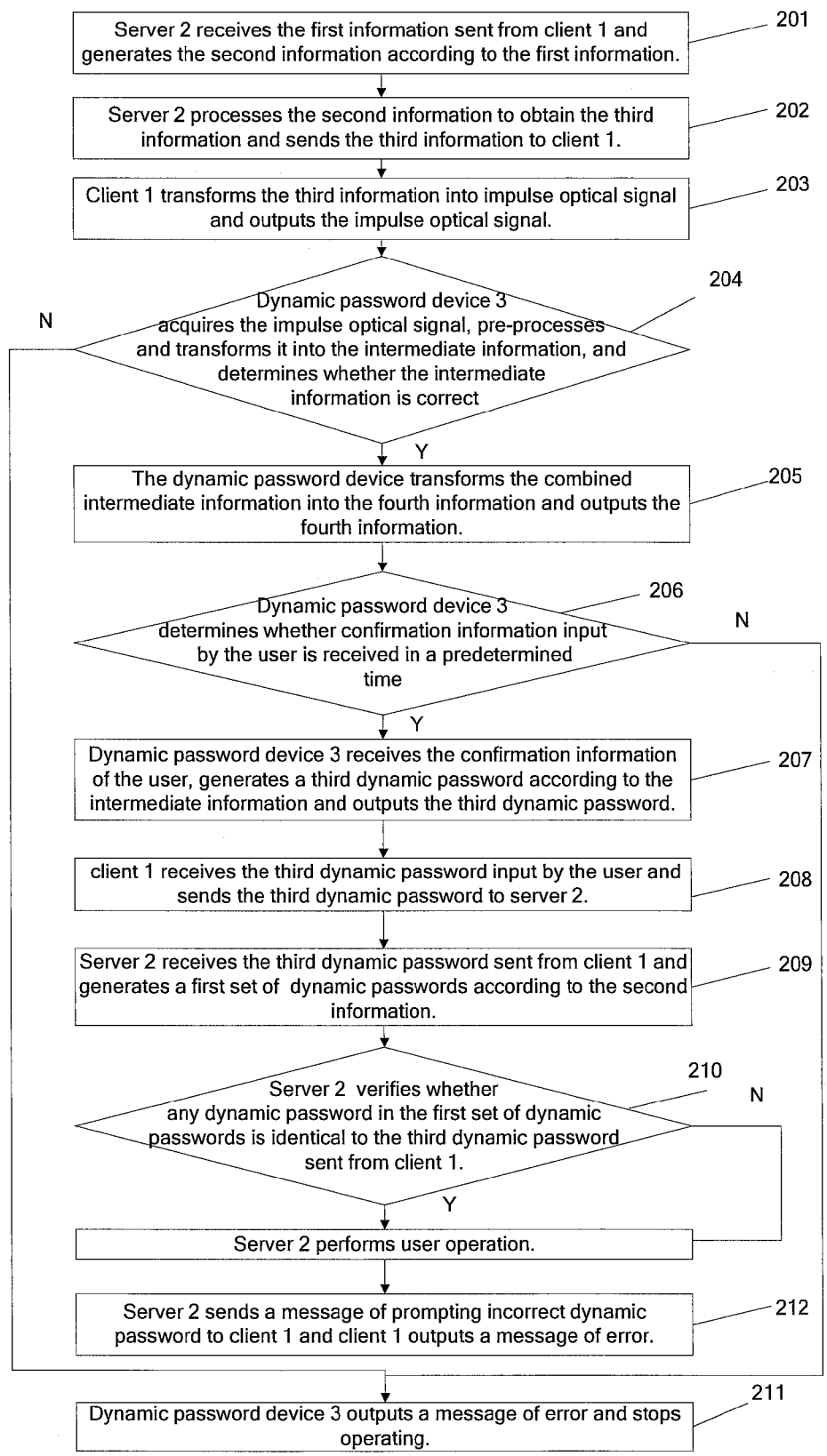
FIG. 5 is a flow chart illustrating another dynamic password authentication method based on the method shown in FIG. 3.

FIG. 5 is a flow chart illustrating another dynamic password authentication method based on the method shown in FIG. 3. As shown in FIG. 5, the embodiment provides a second detailed dynamic password authentication method, which specifically includes the following steps.

Step 201, server 2 receives a first information from client 1 and generates a second information according the first information.

The first information in the embodiment includes: user identification code, account information, amount and additional information, etc. The user identification code is for identifying a user and can be modified by the user; the additional information is a set of information input by the user which can be character combination of any length.

Preferably, in the embodiment, for example, the first information is <?xml version="1.0" encoding="UTF-8" ?> <T><D><M><k> user identification code: </k><v>123456</v></M><M><k> account information: </k><v>11112222</v></M></D><E><M><k> amount: </k><v>45600</v></M></E></T>;

user identification code: 123456;
account information: 11112222;
amount: 45600.

The first information can further include predetermined data such as time, place, password, etc.

Server 2 can take the predetermined information as the second information, or do not extract the predetermined information and take the first information as the second information. Server 2 can further generate the second information by adding other information on the basis of predetermined information. Preferably, in the embodiment, server 2 extracts predetermined information and adds the additional information on the basis of the predetermined information to obtain the second information. Correspondingly, the second information generated by server 2 includes:

user identification code: 123456;
account information: 11112222; amount: 45600; and
additional information: 654321.

The second information can further include a first challenge code generated by server 2.

Server 2 respectively transforms information in the second information according to different sets, and generates a general data packet which is specifically as the following:

a0 7 31 32 33 34 35 36 0 a1 9 31 31 31 31 32 32 32 32 9 a2 6 34 35 36 30 30 22 a3 7 36 35 34 33 32 31 22.

In the general data packet, a0, a1, a2 and a3 represent header information of data packets respectively. That a set of data has been received can be determined according to the header information.

In step 201 of the embodiment, the header information can be represented by characters which are not allowed in the ASCII table, avoiding the confusion with the transferred byte of data.

Step 202, server 2 processes the second information to obtain the third information and sends the third information to client 1;

Alternatively, step 202 can be that server 2 sends the second information to client 1, and client 1 processes the second information to obtain the third information. The method that client 1 processes the second information to obtain the third information is the same as the method that server 2 processes the second information to obtain the third information.

The specific implement process of step 202 of the embodiment is identical to step 102 of Embodiment 1. No more detail is given here.

Step 203, client 1 transforms the third information into impulse optical signal and outputs the impulse optical signal;

The specific implement process of step 203 of the embodiment is identical to step 103 of Embodiment 1. No more detail is given here.

Step 204, dynamic password device 3 acquires the impulse optical signal, pre-processes and transforms the impulse optical signal into intermediate information, and determines whether the intermediate information is correct; and the dynamic password device determines whether the intermediate information is correct in a predetermined time;
if yes, go to step 205; and
if no, go to step 211.

Preferably, dynamic password device 3 receives the impulse optical signal by a illumination element. One or more illumination elements can be located on the dynamic password device. If more than one illumination elements are located on the dynamic password device, the forms of the arrangement of illumination elements can include: arrangement in one line, arrangement in matrix, arrangement in circular, etc.

The first method that dynamic password device 3 acquires the impulse optical signal, pre-processes and transforms the impulse optical signal into the intermediate information and determines whether the intermediate information is correct is identical to the first method that dynamic password device 3 acquires the impulse optical signal, pre-processes and transforms the impulse optical signal into the intermediate information and determines whether the intermediate information is correct of step 104 in Embodiment 1. No more detail is given here.

The second method that dynamic password device 3 acquires the impulse optical signal, pre-processes and transforms the impulse optical signal into the intermediate information and determines whether the intermediate information is correct is identical to the second method that dynamic password device 3 acquires the impulse optical signal, pre-processes and transforms the impulse optical signal into the intermediate information and determines whether the intermediate information is correct of step 104 in Embodiment 1. No more detail is given here.

Step 205, the dynamic password device transforms the combined intermediate information into the fourth information and outputs the fourth information.

Specifically, the dynamic password device extracts and transforms part or all of the information in the intermediate information into decimal value as the fourth information. The fourth information is convenient for the user to view.

It should be noted that, in the present embodiment, the fourth information includes the user identification code, account information, amount and additional information.

Step 206, dynamic password device 3 determines whether confirmation information input by the user is received in a predetermined time;
if yes, go to step 207; and
if no, go to step 211.

Preferably, in step 206 of the embodiment, the predetermined time is 60 seconds.

Step 207, dynamic password device 3 receives the confirmation information of the user, generates the third dynamic password according to the intermediate information, and outputs the third dynamic password.

Specifically, the method that dynamic password device 3 generates the dynamic password can be that dynamic password device 3 takes the intermediate information as a first dynamic factor and performs encryption computation on the first dynamic factor and a first additional dynamic factor and a pre-stored first static factor using an inbuilt algorithm to generate the third dynamic password, and outputs the third dynamic password;

Preferably, the first additional dynamic factor can be time factor or times factor. If the second information sent from server 2 to the client 2 includes the first challenge value, the first additional dynamic factor can be the first challenge code or a combination of the first challenge code and the time factor (times factor);

In the embodiment, the first challenge value is generated by server 2 and sent to client 1 with the second information. Client 1 outputs the first challenge code in the form of impulse optical signal.

Step 208, client 1 receives the third dynamic password input by the user and sends the third dynamic password to server 2.

Step 209, server 2 receives the third dynamic password sent from client 1 and generates a first set of dynamic passwords.

The method that server 2 generates the first set of the dynamic passwords is identical to the method that dynamic password device 3 generates the third dynamic password in step 207.

Specifically, in the embodiment, server 2 takes the inbuilt second information as the second dynamic factor, increases or decreases it in a predetermined range according to the second additional dynamic factor, and performs encryption computation on the second dynamic factor, the second additional dynamic factor and the pre-stored second static factor to generate the first set of dynamic passwords.

The method that dynamic password device 3 generates the dynamic password can also be that dynamic password device 3 takes the intermediate information as the first dynamic factor, performs encryption computation on the first dynamic factor, current time factor (times factor) and the pre-stored static factor using an inbuilt algorithm to generate the first dynamic password, and outputs the first dynamic password;

The second additional dynamic factor is identical to the first additional dynamic factor for generating the third dynamic factor; and the pre-stored static factor of server 2 is identical to the first static factor in dynamic password device 3.

Step 210, server 2 verifies whether any dynamic password in the first set of dynamic passwords is identical to the third dynamic password sent from client 1;

if yes, the verification is passed and user operation is performed; and if no, go to step 212.

Step 211, dynamic password device 3 outputs a message of error and stops operation.

Step 212, server 2 sends a message of prompting incorrect dynamic password to client 1, and client 1 outputs a message of error.

Preferably, in the embodiment, step 212 can perform the following operation: server 2 sends the message of prompting incorrect dynamic password to client 1; and client 1 prompts the user to input the dynamic password again.

Specifically, the implementation of step 102, step 103 and step 104 of the embodiment shown in FIG. 4 of the present invention, is as the following.

Step 102, server 2 processes the second information to obtain the third information and sends the third information to client 1.

The first method that server 2 processes the second information specifically includes that server 2 performs mapping processing to every bit of the second information by a predetermined data process mode, and the control information of server 2 controls client 1 to output different brightness status according to different transmission bits in an output area.

For example, when the transmission bit is "1", the status that server 2 controls client 1 to output is a first brightness; and when the transmission bit is "0", the status that server 2 controls client 1 to output is a second brightness.

In the present method, the third information includes the second information and control information. The control information is used for controlling the blinking of the impulse optical signal.

The second method that server 2 processes the second information specifically includes that:

server 2, according to a predetermined data processing mode, sets different brightness status according to different transmission bits beforehand, and maps the second information to be transmitted to a dynamic impulse optical signal image.

For example, when the transmission bit is "1", server 2 controls the status output by the color block corresponding to the dynamic impulse optical image to be the first brightness; and when the transmission bit is "0", server 2 controls the status output by the color block corresponding to the dynamic impulse optical image to be the second brightness. Server 2 maps the second information to be transmitted to the dynamic impulse optical signal image according to different transmission bits.

It should be noted that the dynamic impulse optical signal image can be in many dynamic image formats, such as GIF etc.

Specifically, the dynamic impulse optical signal image mapped by server 2 can be classified in two forms.

In the first form, the dynamic impulse optical signal image only contains a single brightness color block.

The data in the second information is output in the form of serial output. In order to distinguish the start and the completion of the output of every byte of data, server 2 further comprises start instruction and end instruction of output in the blinking process in which data is output in form of serial output via the dynamic impulse optical signal image according to a predetermined method. The start instruction represents the starting of output of one byte of data, and data is output after the ending of the start instruction. The end instruction represents the completion of the output of the byte of data.

The start instruction and the end instruction are set according to a method agreed beforehand between server 2 and dynamic password device 3.

In the second form, the dynamic impulse signal image contains a plurality of brightness color blocks.

The plurality of brightness color blocks comprises two parts: the control color blocks and the data output color blocks. In this case, when the control color block is a clock signal color block, the control color block is for controlling the output synchronization of the data output color blocks and controlling (a set of) data to be output at clock ascending (descending) edge. In order to distinguish start of data output and completion of data output, server 2 further comprises start instruction and end instruction of output in the blinking process in which a piece of (a set of) data is output via data output color block(s) (in the process that the clock signal color block outputs clock signal) according to a predetermined method. The start instruction represents the starting of output of one byte of data, and data is output after the ending of the start instruction. The end instruction represents the completion of the output of the byte of data. If the data output is in form of four bits parallel transmission, technical effect can be achieved by outputting high four bits of one byte of data at clock descending (ascending) edge and outputting low four bits at clock ascending (descending) edge. If the data output is in form of eight bits parallel transmission, technical effect can be achieved by outputting one byte of data at clock descending (ascending) edge as well.

When the control color block is a differential signal color block, the differential signal color block is for sampling a first brightness and a second brightness respectively so as to set and output the threshold brightness values for different brightness of a screen at client 1. According to a predetermined method, when the brightness of the output status is higher (lower) than the threshold brightness value, server 2 regards the output status as the first brightness, and when the brightness of the output status is lower (higher) than the threshold brightness value, server 2 regards the output status as the second brightness. The differential signal color block can enable dynamic password device 3 to receive and identify the status of optical signal more correctly in the condition that the screen of client 1 is very dark. In order to distinguish start of data output and completion of data output, server 2 further comprises start instruction and end instruction of output in the blinking process in which a piece of (a set of) data is output via data output color block(s) (in the process that the differential signal color block outputs clock signal) according to a predetermined method. The start instruction represents the starting of output of one byte of data, and data is output after the ending of the start instruction. The end instruction represents the completion of the output of the byte of data. If the data output is in the form of eight digits parallel transmission, technical effect can be achieved by outputting one byte of data when differential signal outputs the threshold brightness value.

In the method, the third information is dynamic impulse optical signal image.

Step 103, client 1 receives the third information, transforms the third information into impulse optical signal and outputs the impulse optical signal.

In the embodiment, for the first method that server 2 processes the second information in step 102, the first method that client 1 receives the third information and transforms the third information into impulse optical signal and outputs the impulse optical signal specifically includes that: the client is controlled by the controlling information and outputs different brightness statuses in the output area according to the controlling information and transmission bit. For example, when the transmission bit is 1, the output status of client 1 is the first brightness; and when the transmission bit is 0, the output status of client 1 is the second brightness.

Specifically, client 1 outputs the impulse optical signal in two forms.

In the first form, the impulse optical signal contains a single brightness color block only.

The data in the second information is output in the form of serial output. In order to distinguish the start and the completion of the output of every byte of data, client 1 further comprises start instruction and end instruction of output in the blinking process in which data is output in form of serial output via the dynamic impulse optical signal image according to the control of the controlling information. The start instruction represents the starting of output of one byte of data, and data is output after the ending of the start instruction. The end instruction represents the completion of the output of the byte of data.

The start instruction and the end instruction are set according to a method agreed beforehand between client 1 and dynamic password device 3.

In the second form, the impulse optical signal contains a plurality of brightness color blocks.

Client 1 maps the control information to control color block according to the control of the control information. In this case, when the control color block is a clock signal color block, the control color block is for controlling the output synchronization of the data output color blocks and controlling (a set of) data to be output at clock ascending(descending) edge. In order to distinguish start of data output and completion of data output, server 2 further comprises start instruction and end instruction of output in the blinking process in which a piece of (a set of) data is output via data output color block(s) (in the process that the clock signal color block outputs clock signal) according to a predetermined method. The start instruction represents the starting of output of one byte of data, and data is output after the ending of the start instruction. The end instruction represents the completion of the output of the byte of data. If the data output is in form of four bits parallel transmission, technical effect can be achieved by outputting high four bits of one byte of data at clock descending (ascending) edge and outputting low four bits at clock ascending (descending) edge. If the data output is in form of eight bits parallel transmission, technical effect can be achieved by outputting one byte of data at clock descending (ascending) edge as well.

When the control color block is a differential signal color block, the differential signal color block is for sampling a first brightness and a second brightness respectively so as to set and output the threshold brightness values for different brightness of a screen at client 1. According to a predetermined method, when the brightness of the output status is higher (lower) than the threshold brightness value, client 1 regards the output status as the first brightness, and when the brightness of the output status is lower (higher) than the threshold brightness value, server 2 regards the output status as the second brightness. The differential signal color block can output an intermediate brightness value in the condition that the screen of client 1 is very dark, to enable dynamic password device 3 to receive and identify the status of optical signal more correctly. In order to distinguish start of data output and completion of data output, client 1 further comprises start instruction and end instruction of output in the blinking process in which a piece of (a set of) data is output via data output color block(s) (in the process that the differential signal color block outputs clock signal) according to a predetermined method. The start instruction represents the starting of output of one byte of data, and data is output after the ending of the start instruction. The end instruction represents the completion of the output of the byte of data. If the data output is in the form of eight digits parallel transmission, technical effect can be achieved by outputting one byte of data when differential signal outputs the threshold brightness value.

It should be noted that, the output color block mapped by server 2 can be in many forms according to different resolutions of the displayer of client 1, so that dynamic password device 3 can receive impulse optical signal at the displayer with different resolutions.

Figure 9A:
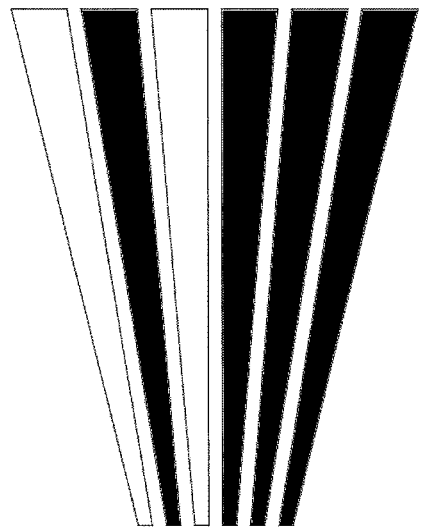
FIG. 9a-FIG. 9h are schematic diagrams of seven kinds of outputting color blocks of the embodiments shown by FIG. 3-FIG. 5 or FIG. 6-FIG. 8.
Figure 9B:
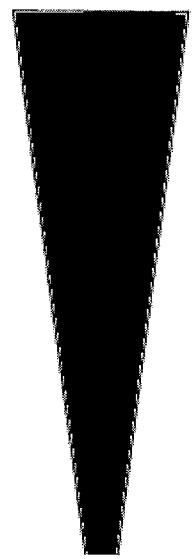
Figure 9C:
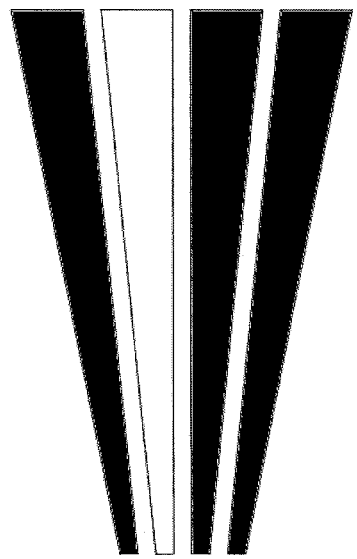
Figure 9D:
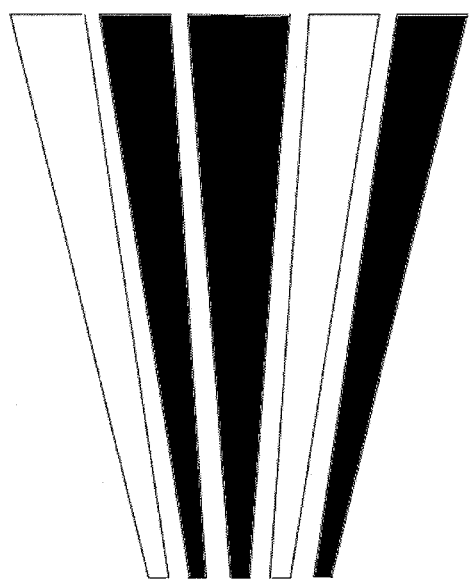
Figure 9E:
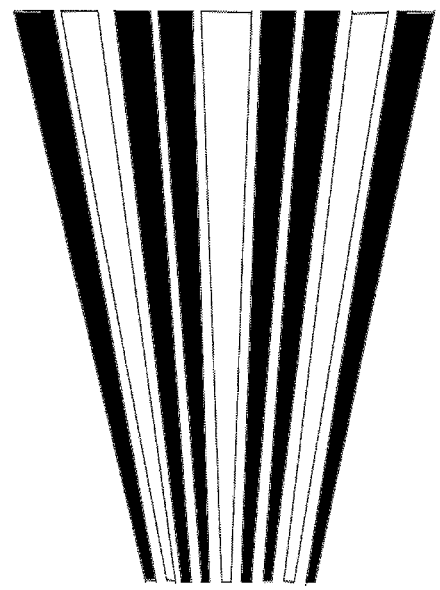
Figure 9F:
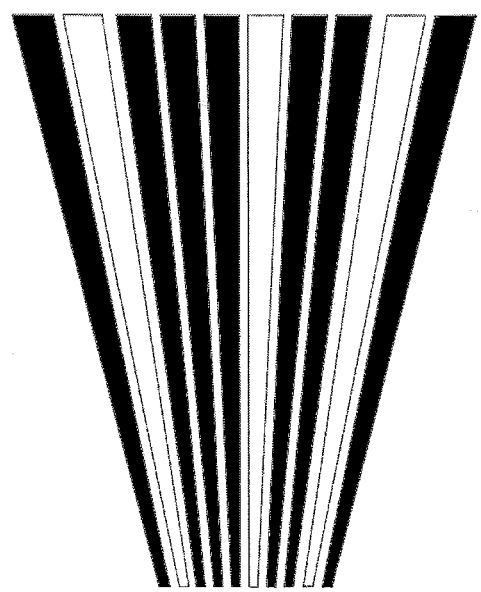
Figure 9G:
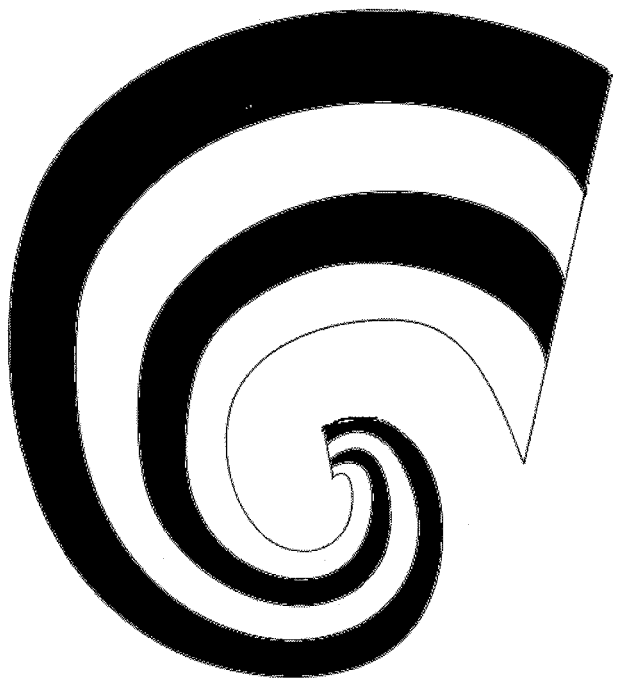
Figure 9H:
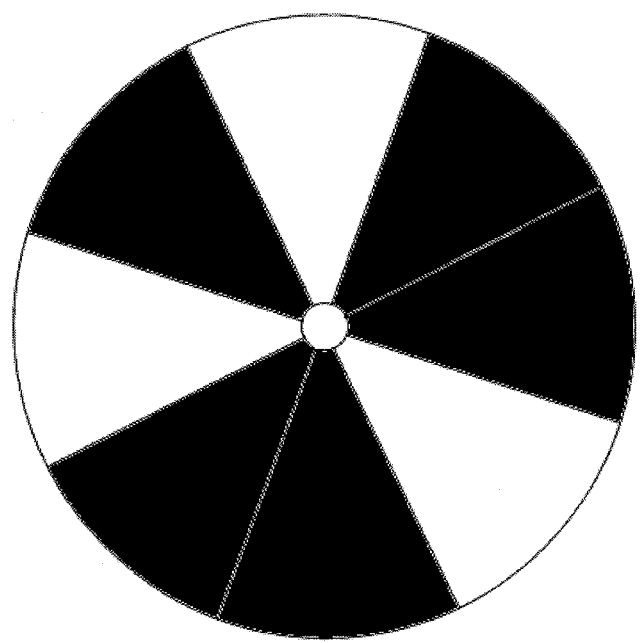

As shown in FIG. 9a-9b, the figures indicate different forms of output color block. It should be noted that those figures are exemplary only. The shape of the color block of output area is not limited to the figures and can be in any shape.

For the second method by which server 2 processes the second information in step 102, the second method, of which the client receives the third information and transforms the third information into impulse optical signal and outputs the impulse optical signal, specifically includes that client 1 outputs the dynamic impulse optical signal image to an area of the screen of client 1.

It should be noted that the area for displaying the dynamic impulse optical image can be random or fixed.

Step 104, dynamic password device 3 acquires impulse optical signal, pre-processes and transforms the impulse optical signal into intermediate information, and determines whether the intermediate information is correct; and the dynamic password device determines whether the received intermediate information is correct in a predetermined time;

if yes, go to step 105; and
if no, go to step 111.

Preferably, dynamic password device 3 receives the impulse optical signal by a illumination element. One or more illumination elements can be located on the dynamic password device. If more than one illumination elements are located on the dynamic password device, the forms of the arrangement of illumination elements can include arrangement in one line, arrangement in matrix, arrangement in circular, etc.

The first method, by which dynamic password device 3 acquires the impulse optical signal, pre-processes and transforms the impulse optical signal into the intermediate information, and determines whether the intermediate information is correct, specifically includes the following steps.

Step 1104-1, dynamic password device 3 selects a location where is suitable for dynamic password device 3 to acquire the impulse optical signal in the output area of impulse optical signal, and acquires the impulse optical signal.

Step 1104-2, dynamic password device 3 receives and identifies one byte of data.

Specifically, method 1: if the impulse optical signal output by client 1 is in the first form which only contains a single brightness color block, then according to a predetermined method, dynamic password device 3 receives the start instruction, and learns that the receiving of the byte of data is completed by the end instruction, and then identifies the received impulse optical signal according to a data processing mode agreed beforehand with server 2. For example, if the received status is the first brightness, identify it as the transmission bit 1; and when the received status is the second brightness, identify it as the transmission bit 0.

Method 2: if client 1 outputs the impulse optical signal in the second form which contains a plurality of brightness color blocks and the control color block is the clock signal color block, then dynamic password device 3 receives the impulse optical signal synchronously as that the clock signal color block outputs the clock signal, and receives the data according to the ascending edge (descending edge) of the clock signal and according to the method by which the data is output via data output color block. If an output instruction is received, dynamic password device 3 can determine start instruction and end instruction according to the type of the instruction, so as to receive the byte of data. Dynamic password device 3 can also receive a byte (half byte) of data at the descending (ascending) edge of the clock signal according a predetermined method.

Method 3: if client 1 outputs the impulse optical signal in the second form which contains a plurality of brightness color blocks and the control color block is the differential signal color block, then dynamic password device 3 determines the brightness status of the received impulse optical signal according to the threshold brightness value output by the differential signal color block, and then first receives the start instruction according to the output impulse optical signal, and learns that the receiving of the byte of data is completed by the end instruction, and then identifies the received impulse optical signal to obtain the byte of data according to the data processing mode agreed beforehand with server 2. Dynamic password device 3 can also receive the byte of data when receiving threshold brightness value output by the differential signal.

Step 1104-3, dynamic password device 3 determines whether the byte of data is header information;
if no, go to step 1104-2; and
if yes, go to step 1104-4.

That dynamic password device 3 determines whether the byte of data is header information is implemented by determining whether the byte of data is a character which is not allowed in the ASCII table. If the byte of data is a character which is not allowed in the ASCII table, the byte of data is regarded as the header information.

It should be noted that if the dynamic password device can not determine the byte of data representing the header information in a predetermined time, then the dynamic password is timeout, and the operation ends.

Step 1104-4, dynamic password device 3 receives a set of intermediate information which contains the header information and determines whether the set of the intermediate information is correct;

dynamic password device 3 receives a predetermined number of bytes of data after the header information and combines the header information and the subsequent predetermined number of bytes of data to obtain the set of intermediate information;
if no, go to step 1104-2; and
if yes, go to step 1104-5.

Specifically, dynamic password device 3 determines whether the set of intermediate information is correct by determining the check bit of the set of the intermediate information.

Step 1104-5, dynamic password device 3 stores the set of intermediate information and determines whether all of the set of intermediate information is identified and stored;
if no, go to step 1104-2; and
if yes, go to step 1104-6.

Step 1104-6, dynamic password device 3 combines all of the intermediate information.

The second method, by which dynamic password device 3 acquires the impulse optical signal, pre-processes and transforms the impulse optical signal into the intermediate information, and determines whether the intermediate information is correct, specifically includes the following steps.

Step 1204-1, dynamic password device 3 selects a location where is suitable for dynamic password device 3 to acquire the impulse optical signal in the output area of impulse optical signal and acquires the impulse optical signal.

Step 1204-2, dynamic password device 3 receives and identifies all of the data, and classifies all of the data into a plurality of sets of intermediate information according to the header information.

Dynamic password device 3 receives and identifies all of the data and combines all of the data into bytes of data according to a predetermined method, and combines the byte of data which is regarded as the header information and the predetermined number of bytes of data subsequent to the header information to be data packet, that is, to obtain a plurality of sets of intermediate information.

The methods by which dynamic password device 3 receives and identifies all of the data are as the following.

Method 1: if the impulse optical signal output by client 1 is in the first form which only contains a single brightness color block, then according to a predetermined method, dynamic password device 3 receives the start instruction, and learns that the receiving of the byte of data is completed by the end instruction, and then identifies the received impulse optical signal according to a data processing mode agreed beforehand with server 2. For example, if the received status is the first brightness, identify it as the transmission bit 1; and when the received status is the second brightness, identify it as the transmission bit 0. Repeat the above steps, till all of the data is received.

Method 2: if client 1 outputs the impulse optical signal in the second form which contains a plurality of brightness color blocks and the control color block is the clock signal color block, then dynamic password device 3 receives the impulse optical signal synchronously as that the clock signal color block outputs the clock signal, and receives the data according to the ascending edge (descending edge) of the clock signal and according to the method by which the data is output via data output color block. If an output instruction is received, dynamic password device 3 can determine start instruction and end instruction according to the type of the instruction, so as to receive the byte of data. Dynamic password device 3 can also receive a byte (half byte) of data at the descending (ascending) edge of the clock signal according a predetermined method. Repeat the above steps, till all of the data is received.

Method 3: if client 1 outputs the impulse optical signal in the second form which contains a plurality of brightness color blocks and the control color block is the differential signal color block, then dynamic password device 3 determines the brightness status of the received impulse optical signal according to the threshold brightness value output by the differential signal color block, and then first receives the start instruction according to the output impulse optical signal, and learns that the receiving of the byte of data is completed by the end instruction, and then identifies the received impulse optical signal to obtain the byte of data according to the data processing mode agreed beforehand with server 2. Dynamic password device 3 can also receive the byte of data when receiving threshold brightness value output by the differential signal. Repeat the above steps, till all of the data is received.

Dynamic password device 3 determines whether a byte of data is a character which is not allowed in the ASCII table to determine whether the byte of data is header information.

Step 1204-3, dynamic password device 3 determines whether every set of intermediate information is correct one by one;

if at least one set of intermediate information is not correct, go to step 1204-4; and if all sets of intermediate information are correct, go to step 1204-5.

Specifically, dynamic password device 3 determines whether the set of intermediate information is correct by determining the check bit of every set of intermediate information.

Step 1204-4, dynamic password device 3 continues receiving and identifying the rest intermediate information which has not been determined, and go to step 1204-3.

Step 1204-5, the dynamic password combines all of the intermediate information.

In the embodiment, the first brightness is a little bit lighter and the second brightness is a little bit darker. When the brightness value is higher than the brightness threshold, the brightness is regarded to be the first brightness; and when the brightness value is lower than the darkness threshold, the brightness is regarded to be the second brightness. Alternatively, the first brightness is a little bit darker and the second brightness is a little bit lighter. When the brightness value is higher than the brightness threshold, the brightness is regarded to be the second brightness; and when the brightness value is lower than the darkness threshold, the brightness is regarded to be the first brightness.

Embodiment 4

Figure 6:
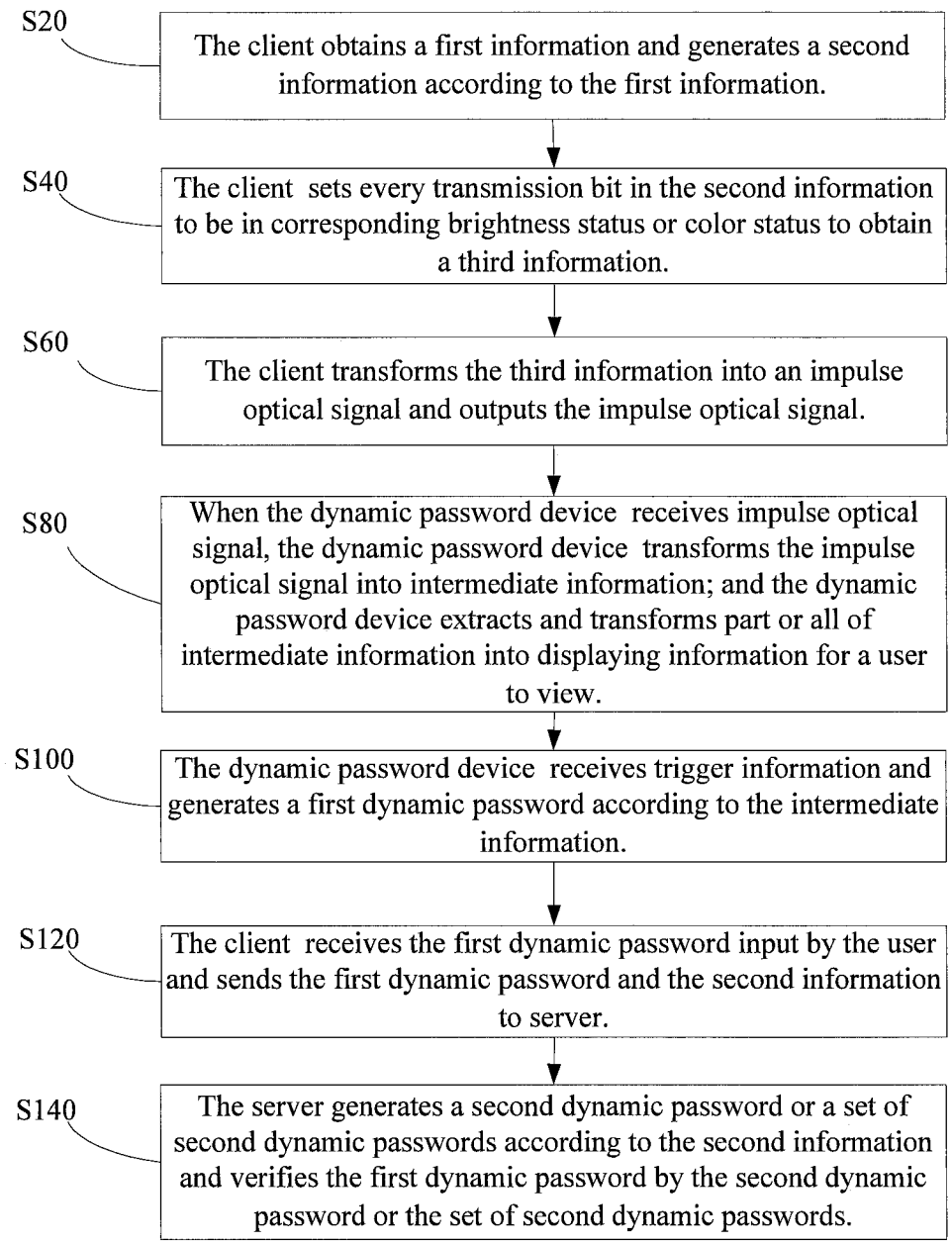
FIG. 6 is a flow chart illustrating a dynamic password authentication method of Embodiment 4 of the present invention.

FIG. 6 is a flow chart illustrating a dynamic password authentication method according to Embodiment 4 of the present invention. As shown in FIG. 6, the method includes following steps.

Step S20, client 1 obtains a first information and generates a second information according to the first information.

Step S40, client 1 sets every transmission bit in the second information to be in corresponding brightness status or color status to obtain a third information; and the third information includes blinking information of impulse optical signal or image information of dynamic impulse optical signal.

Step S60, client 1 transforms the third information into an impulse optical signal and outputs the impulse optical signal.

Step S80, when dynamic password device 3 receives impulse optical signal, dynamic password device 3 transforms the impulse optical signal into intermediate information; and dynamic password device 3 extracts and transforms part or all of intermediate information into displaying information for a user to view.

Step S100, dynamic password device 3 receives trigger information and generates a first dynamic password according to the intermediate information.

Step S120, client 1 receives the first dynamic password input by the user and sends the first dynamic password and the second information to server 2.

Step S140, server 2 generates a second dynamic password or a set of second dynamic passwords according to the second information and verifies whether the first dynamic password is legitimate by the second dynamic password or the set of second dynamic passwords;

if the first dynamic password is identical to the second dynamic password or any second dynamic password in the set of the second passwords, the first dynamic password is verified to be legitimate; and if the first dynamic password is not identical to the second dynamic password or any second dynamic password in the set of the second passwords, the first dynamic password is verified to be not legitimate.

The dynamic password authentication method of the embodiment of the present invention adapts a transmission method without wired connection to transfer related user information to dynamic password device 3, which omits the step of manual input applied by the related art and increases transmission efficiency of a large quantity of data. Specifically, when the technical solution of the embodiment is applied in online transaction, the client transmits related user information to dynamic password device 3 via non-wired connection and generates a corresponding dynamic password. The dynamic password is compared with a dynamic password generated by server 2, which improves security. Dynamic password device 3 in the present invention needs user information as dynamic factor to participate in generating a dynamic password. Compared with embodiment 3, client 1 in embodiment 4 completes the transforming process of the first information, which reduces the workload of server 2 and relatively improves working efficiency.

Step S40 of the embodiment, e.g. client 1 sets every transmission bit in the second information to be in corresponding brightness status or color status to obtain the third information, specifically includes that: client 1 controls the brightness status or color status of every transmission bit in the second information in a predetermined area according to a control signal to obtain the blinking information of impulse optical signal; or client 1 controls the brightness status or color status of every transmission bit in the second information in different areas according to a control signal to obtain the image information of the dynamic impulse optical signal.

In the embodiment of the present invention, step S80, e.g. when dynamic password device 3 receives the impulse optical signal, dynamic password device 3 transforms the impulse optical signal into intermediate information, can include: A'. acquiring the impulse optical signal in the predetermined area; B'. receiving and identifying a byte of data in the impulse optical signal; C'. determining whether the byte of data is header information; if the byte of data is header information, performing D'; and if the byte of data is not header information, returning back to B' for continuing identifying a byte of data; D'. receiving and identifying the impulse optical signal representing a predetermined number of bytes of data after the header information, and transforming and combining the header information and the predetermined number of bytes of data to obtain a set of intermediate information; and E'. after receiving all sets of intermediate information, combining all sets of the intermediate information.

Another way for implementing that when dynamic password device 3 receives the impulse optical signal, the dynamic password 3 transforms the impulse optical signal into the intermediate information can be that: acquiring the impulse optical signal in a predetermined output area; receiving and identifying all bytes of data of the impulse optical signal, and transforming to obtain all sets of intermediate information; combining all of bytes of data representing header information and predetermined number of bytes of data after header information to obtain every set of intermediate information; combining every set of intermediate information to obtain all sets of the intermediate information; and combing all sets of intermediate information.

Figure 7:
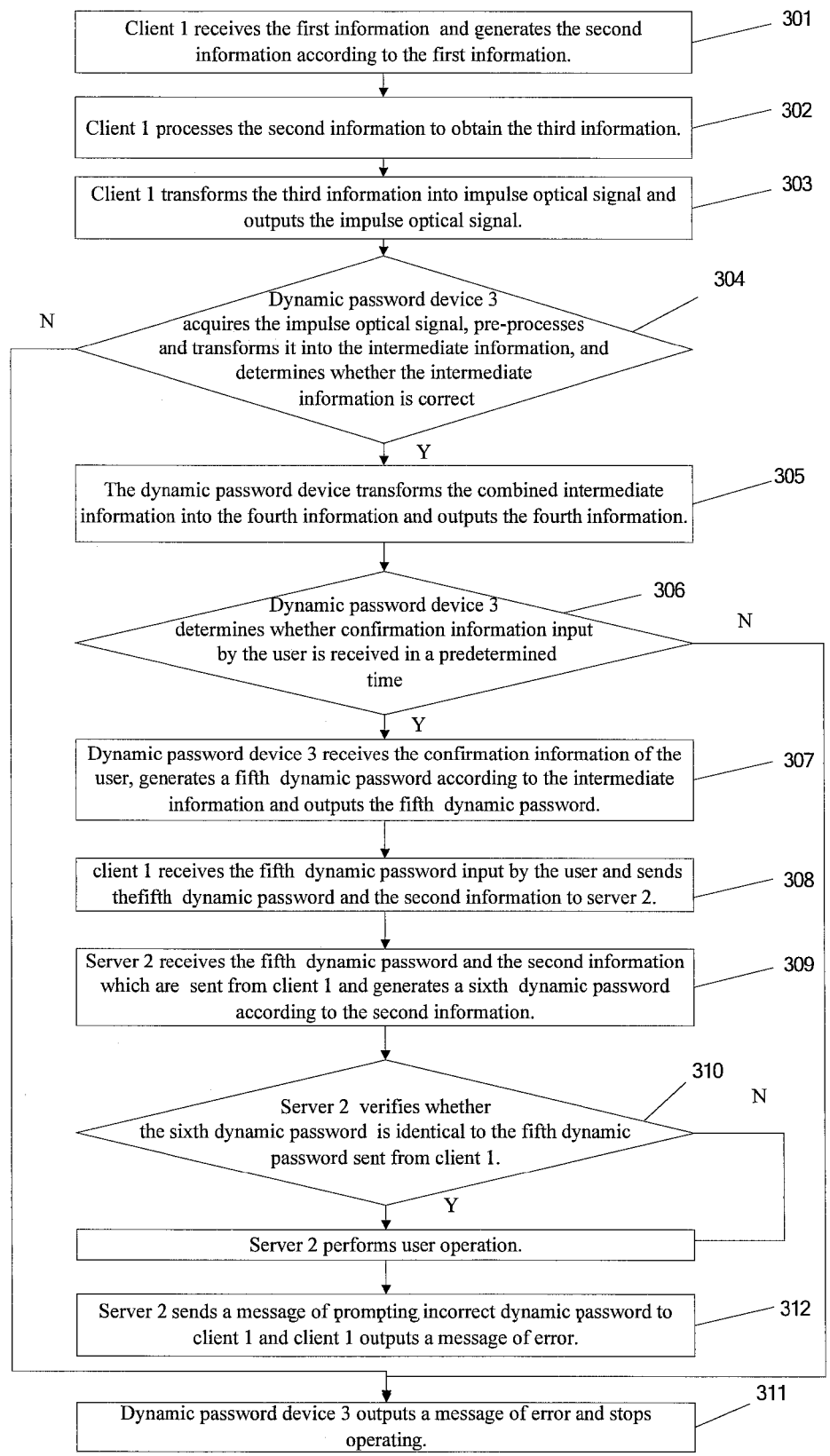
FIG. 7 is a flow chart illustrating the dynamic password authentication method based on the method shown in FIG. 6.

FIG. 7 is a flow chart illustrating the dynamic password authentication method based on the method shown in FIG. 6.

Step 301, client 1 receives the first information and generates the second information according to the first information.

The first information in the embodiment includes user identification code, account information, amount and additional information, etc. The user identification code is for identifying a user and can be modified by the user; and the additional information is a set of information input by the user which can be character combination of any length.

Client 1 extracts a piece of predetermined information from the first information according to a predetermined method and generates the second information according to the predetermined information.

For example, in the embodiment, the first information is <?xml version="1.0" encoding="UTF-8"?><T><D><M><k>
the user identification code: </k><v>123456</v></M><M><k> the account information: </k><v>11112222</v></M></D><E><M><k> the amount: </k><v>45600</v></M></E></T> user identification code: 123456;
account information: 11112222;
amount: 45600.

The first information can further includes predetermined data such as time, place and password, etc.

Client 1 can take the predetermined information as the second information, or do not extract the predetermined information and take the first information as the second information directly. Client 1 can also generate the second information by adding other information on the basis of predetermined information. Preferably, in the embodiment, client 1 extracts predetermined information and adds additional information in the predetermined information to obtain the second information. Correspondingly, the second information generated by client 1 includes:

user identification code: 123456;
account information: 11112222;
amount: 45600; and
additional information: 654321.

Client 1 respectively transforms information in the second information according to different sets, and generates a general data packet which is specifically as the following:

a0 7 31 32 33 34 35 36 0 a1 9 31 31 31 31 32 32 32 32 9 a2 6 34 35 36 30 30 22 a3 7 36 35 34 33 32 31 22.

In the general data packet, a0, a1, a2 and a3 represent header information of data packets respectively. That a set of data has been received can be determined according to the header information.

In step 301 of the embodiment, the header information can be represented by characters which are not allowed in the ASCII table, avoiding the confusion with the transferred bytes of data.

Step 302, client 1 processes the second information to obtain the third information.

Step 303, client 1 transforms the third information into impulse optical signal and outputs the impulse the optical signal.

Step 304, dynamic password device 3 acquires the impulse optical signal, pre-processes and transforms the impulse optical signal into the intermediate information, and determines whether the intermediate information is correct; and the dynamic password device determines whether the intermediate information is correct in a predetermined time;

if yes, go to step 305; and if no, go to step 311.

Preferably, dynamic password device 3 receives the impulse optical signal by an illumination element. One or more illumination elements can be located on the dynamic password device. If more than one illumination elements are located on the dynamic password device, the forms of the arrangement of illumination elements can include: arrangement in one line, arrangement in matrix, arrangement in circular, etc.

The first method, of which dynamic password device 3 acquires the impulse optical signal, pre-processes and transforms the impulse optical signal into the intermediate information, and determines whether the intermediate information is correct in a predetermined time, is the same as the first method, of which dynamic password device 3 acquires the impulse optical signal, pre-processes and transforms the impulse optical signal into the intermediate information, and determines whether the intermediate information is correct, in step 104 of Embodiment 1. No more detail is given here.

The second method, of which dynamic password device 3 acquires the impulse optical signal, pre-processes and transforms the impulse optical signal into intermediate information, and determines whether the intermediate information is correct in a predetermined time, is the same as the second method, of which dynamic password device 3 acquires the impulse optical signal, pre-processes and transforms the impulse optical signal into the intermediate information, and determines whether the intermediate information is correct, in step 104 of Embodiment 1. No more detail is given here.

Step 305, the dynamic password device transforms the combined intermediate information into the fourth information and outputs the fourth information.

Specifically, the dynamic password device extracts and transforms part or all of the intermediate information into decimal value as the fourth information; and the fourth information is display information which is convenient for the user to view.

It should be noted that, in the present embodiment, the fourth information includes the user identification code, account information, amount and additional information of the user.

Step 306, dynamic password device 3 determines whether a confirmation information input by the user is received in a predetermined time;

if yes, go to step 307; and if no, go to step 311.

Preferably, in the step 306 of the embodiment, the predetermined time is 60 seconds.

Step 307, dynamic password device 3 receives the confirmation information from the user, generates a fifth dynamic password according to the intermediate information and outputs the fifth dynamic password.

Specifically, the method by which dynamic password device 3 generates a dynamic password can include that: dynamic password device 3 takes the intermediate information as the third dynamic factor, performs encryption computation on the third dynamic factor and a pre-stored first static factor using an inbuilt algorithm, generates the fifth dynamic password, and outputs the fifth dynamic password.

Step 308, client 1 receives the fifth dynamic password input by the user and sends the fifth dynamic password and the second information to server 2.

Step 309, server 2 receives the fifth dynamic password and the second information sent from client 1 and generates a sixth dynamic password according to the second information.

The method by which server 2 generates the sixth dynamic password is identical to the method by which dynamic password device 3 generates the fifth dynamic password in step 307.

Preferably, the second static factor pre-stored by server 2 is identical to the first static factor in dynamic password device 3.

Step 310, the server verifies whether the sixth dynamic password is identical to the fifth dynamic password sent from client 1;

if yes, the verification is successful and user operation is performed; and if no, go to step 312.

Step 311, dynamic password device 3 outputs a message of error and stops the operation.

Step 312, server 2 sends a message prompting that the dynamic password is incorrect to client 1, and client 1 outputs a message of error.

Preferably, in the embodiment, step 312 can also perform the following operation: server 2 sends the message of prompting incorrect dynamic password to client 1; and client 1 prompts the user to input the dynamic password again.

Figure 8:
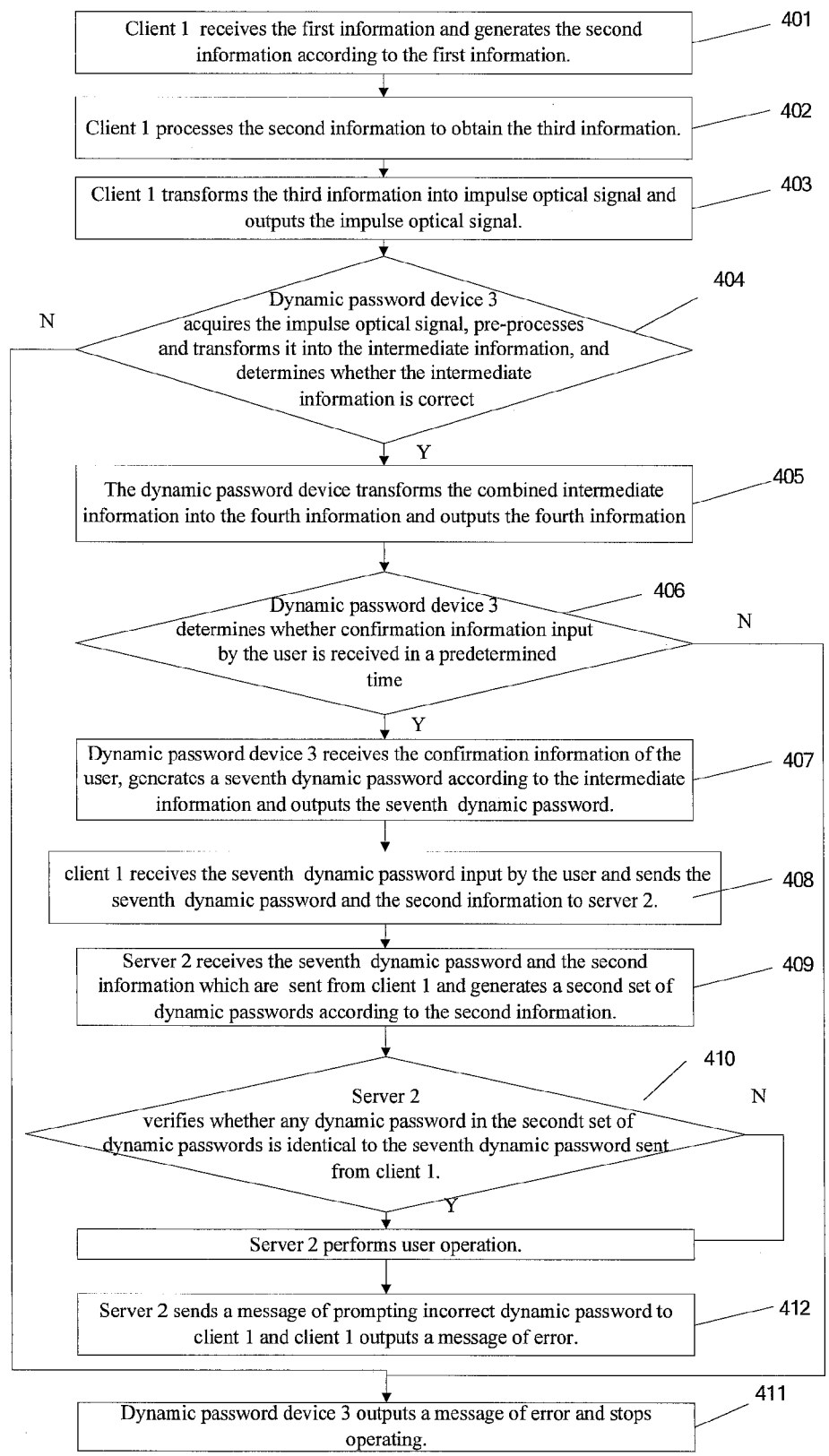
FIG. 8 is a flow chart illustrating another dynamic password authentication method based on the method shown in FIG. 6.

FIG. 8 is a flow chart illustrating another dynamic password authentication method based on the method shown in FIG. 6. As shown in FIG. 8, the forth method of generating a dynamic method includes the following steps.

Step 401, client 1 receives the first information and generates the second information according to the first information.

The first information in the embodiment includes user identification code, account information, amount and additional information, etc. The user identification code is for identifying a user and can be modified by the user; and the additional information is a set of information input by the user which can be character combination of any length.

Server 2 extracts a piece of predetermined information from the first information according to a predetermined method and generates the second information according to the predetermined information.

For example, in the embodiment, the first information is <?xml version="1.0" encoding="UTF-8"?><T><D><M><k> the user identification code: </k><v>123456</v></M><M><k> the account information: </k><v>11112222</v><M><D><E><M><k> the amount: </k><v>45600</v></M></E></T> user identification code: 123456;

account information: 11112222;

amount: 45600.

The first information can also include the predetermined information such as time, place and password.

Server 2 can take the predetermined information as the second information, or do not extract the predetermined information and take the first information as the second information directly. Server 2 can also generate the second information by adding other information on the basis of predetermined information. Preferably, in the embodiment, server 2 extracts predetermined information and adds additional information in the predetermined information to obtain the second information. Correspondingly, the second information generated by server 2 includes:

user identification code: 123456;

account information: 11112222;

amount: 45600; and additional information: 654321.

The server respectively transforms information in the second information according to different sets, and generates a general data packet which is specifically as the following:

a0 7 31 32 33 34 35 36 0 a1 9 31 31 31 31 32 32 32 32 9 a2 6 34 35 36 30 30 22 a3 7 36 35 34 33 32 31 22.

In the general data packet, a0, a1, a2 and a3 represent header information of data packets respectively. That a set of data has been received can be determined according to the header information.

In step 401 of the embodiment, the header information can be represented by characters which are not allowed by the ASCII table, avoiding the confusion with the transferred bytes of data.

Step 402, client 1 processes the second information to obtain a third information.

The implementing process of step 402 in the embodiment is identical to the step 302 in the embodiment 3. No more detail is given here.

Step 403, client 1 transforms the third information into impulse optical signal and outputs the impulse optical signal.

The implementing process of step 403 in the embodiment is identical to step 303 in Embodiment 3. No more detail is given here.

Step 404, dynamic password device 3 acquires the impulse optical signal, pre-processes and transforms the impulse optical signal into the intermediate information, and determines whether the intermediate information is correct; and the dynamic password device determines whether the intermediate information is correct in a predetermined time;

if yes, go to step 405; and if no, go to step 411.

Preferably, dynamic password device 3 receives the impulse optical signal by an illumination element. One or more illumination elements can be located on dynamic password device 3. If more than one illumination elements are located on dynamic password device 3, the forms of the arrangement of illumination elements can include arrangement in one line, arrangement in matrix, arrangement in circular, etc.

The first method, of which dynamic password device 3 acquires the impulse optical signal, pre-processes and transforms the impulse optical signal into the intermediate information, and determines whether the intermediate information is correct in a predetermined time, is the same as the first method, of which dynamic password device 3 acquires the impulse optical signal, pre-processes and transforms the impulse optical signal into the intermediate information, and determines whether the intermediate information is correct, in step 104 of Embodiment 1. No more detail is given here.

The second method, of which dynamic password device 3 acquires the impulse optical signal, pre-processes and transforms the impulse optical signal into intermediate information, and determines whether the intermediate information is correct in a predetermined time, is the same as the second method, of which dynamic password device 3 acquires the impulse optical signal, pre-processes and transforms the impulse optical signal into the intermediate information, and determines whether the intermediate information is correct, in step 104 of Embodiment 1. No more detail is given here.

Step 405, the dynamic password device transforms the combined intermediate information into the fourth information and outputs the fourth information.

Specifically, the dynamic password device extracts part or all of the information in the intermediate information and transforms the extracted information into decimal value and takes the decimal value as the fourth information. The fourth information is display information for the user to view.

It should be noted that, in the embodiment, the fourth information includes user identification code, account data, amount and additional data of the user.

Step 406, dynamic password device 3 determines whether a confirmation information input by a user is received in a predetermined time;
 if yes, go to step 407; and
 if no, go to step 411.

Preferably, in the step 406 of the embodiment, the predetermined time is 60 seconds.

Step 407, the dynamic password device 3 receives the confirmation information from the user, generates a seventh dynamic password and outputs the seventh dynamic password.

Specifically, the method by which dynamic password device 3 generates a dynamic password can include that: dynamic password device 3 takes the intermediate information as the third dynamic factor, performs encryption computation on the third dynamic factor, a third additional dynamic factor and a pre-stored first static factor using an inbuilt algorithm to generate a seventh dynamic password, and outputs the seventh dynamic password.

Preferably, the third additional dynamic factor can be time factor or times factor.

Step 408, client 1 receives the seventh dynamic password input by the user, and sends the seventh dynamic password and the second information to server 2.

Step 409, server 2 receives the seventh dynamic password and the second information sent from client 1, and generates a second set of dynamic passwords according to the second information.

The method by which server 2 generates the second sets of dynamic password is identical to the method by which dynamic password device 3 generates the seventh dynamic password in step 407.

Specifically, in the embodiment, server 2 takes the inbuilt second information as the fourth dynamic factor, performs increasing and decreasing calculation in a predetermined range according to the current fourth additional dynamic factor, and performs encryption computation on the fourth dynamic factor and the fourth additional dynamic factor and the pre-stored second static factor to generates the second set of dynamic passwords.

The fourth additional dynamic factor is identical to the third additional dynamic factor used for generating the seventh dynamic password.

Preferably, the second static factor pre-stored in server 2 is identical to the first static factor in dynamic password device 3.

Step 410, server 2 verifies whether any dynamic password in the second set of dynamic passwords is identical to the seventh dynamic password sent by the user;
 if yes, the verification is successful and user operation is performed; and
 if no, go to step 412.

Step 411, the dynamic password device outputs a message of error and stops the operation.

Step 412, server 2 sends message for prompting that the dynamic password is incorrect to client 1; and client 1 outputs a message of error.

Preferably, in the embodiment, step 412 can further perform following operation: server 2 sends a message of prompting that the dynamic password is incorrect and client 1 prompts the user to input a password again.

In the embodiment 4, step 407 to step 409 can be replaced by step 407' to step 409'.

Step 407', dynamic password device 3 receives the confirmation information from the user, generates the seventh dynamic password according to the third information, and outputs the seventh dynamic password and a second value.

Specifically, the method by which dynamic password device 3 generates a dynamic password can include that: dynamic password device 3 takes the third information as the third dynamic factor, performs encryption computation on the third dynamic factor, the third additional dynamic factor and the pre-stored first static factor using an inbuilt algorithm to generates the seventh dynamic password, and outputs the seventh dynamic password.

Preferably, the third additional dynamic factor can be the second value or a combination of the second value and the time factor (the times factor).

Step 408', client 1 receives the seventh dynamic password and the second value input by the user, and sends the seventh dynamic password, the second value and the second information to server 2.

Step 409', server 2 receives the seventh dynamic password, the second value and the second information sent from client 1 and generates the second set of dynamic passwords according to the second information and the second value.

The method by which server 2 generates the second set of dynamic passwords is identical to the method by which dynamic password device 3 generates the seventh dynamic password in step 407.

Specifically, in the embodiment, server 2 takes the inbuilt second information as the fourth dynamic factor, performs increasing and decreasing calculation in a predetermined range according to the current fourth additional dynamic factor, and performs encryption computation on the fourth dynamic factor, the fourth additional dynamic factor and the pre-stored second static factor using an inbuilt algorithm to generate the second set of dynamic passwords.

The fourth additional dynamic factor is identical to the third additional dynamic factor used for generating the seventh dynamic password.

Preferably, the second static factor pre-stored in server 2 is identical to the first static factor in dynamic password device 3.

Specifically, the implementation of step 302 and step 303 provided by the embodiments shown in FIG. 7 and FIG. 8 are described in detail hereinafter.

Step 302, client 1 processes the second information to obtain the third information.

The first method by which client 1 processes the second information specifically includes that: client 1 performs mapping process on every bit of the second information by a predetermined data processing mode, and controls the output area to output different brightness status according to different transmission bits.

For example, when the transmission bit is "1", the status that client 1 controls to output is the first brightness; and when the transmission bit is "0", the status that client 1 controls to output is the second brightness.

In this method, the third information is the second information.

The second method by which the client processes the second information specifically includes that:

client 1, according to a predetermined data processing mode, sets different brightness status according to different transmission bits beforehand, and maps the second information to be transmitted to the dynamic impulse optical signal image.

For example, when the transmission bit is "1", the status output by the color block corresponding to the dynamic impulse optical signal image controlled by client 1 is the first brightness; and when the transmission bit is "0", the status output by the color block corresponding to the dynamic impulse optical signal image controlled by client 1 is the second brightness. Client 1 maps the second information to be transmitted to the dynamic impulse optical signal image according to different transmission bits.

It should be noted that the format of the dynamic impulse optical signal can be in many dynamic image formats, such as GIF etc.

Specifically, the dynamic impulse optical signal image mapped by client 1 can be classified in two forms.

In the first form, the dynamic impulse optical signal image only contains a single brightness color block.

The data in the second information is output in the form of serial output. In order to distinguish the start and the completion of the output of every byte of data, client 1 further comprises start instruction and end instruction of output in the blinking process in which data is output in form of serial output via the dynamic impulse optical signal image according to a predetermined method. The start instruction represents the starting of output of one byte of data, and data is output after the ending of the start instruction. The end instruction represents the completion of the output of the byte of data.

The start instruction and the end instruction are set according to a method agreed beforehand between client 1 and dynamic password device 3.

In the second form, the dynamic impulse signal image contains a plurality of brightness color blocks.

The plurality of brightness color blocks comprises two parts: the control color blocks and the data output color blocks. In this case, when the control color block is a clock signal color block, the control color block is for controlling the output synchronization of the data output color blocks and controlling (a set of) data to be output at clock ascending (descending) edge. In order to distinguish start of data output and completion of data output, server 2 further comprises start instruction and end instruction of output in the blinking process in which a piece of (a set of) data is output via data output color block(s) (in the process that the clock signal color block outputs clock signal) according to a predetermined method. The start instruction represents the starting of output of one byte of data, and data is output after the ending of the start instruction. The end instruction represents the completion of the output of the byte of data. If the data output is in form of four bits parallel transmission, technical effect can be achieved by outputting high four bits of one byte of data at clock descending (ascending) edge and outputting low four bits at clock ascending (descending) edge. If the data output is in form of eight bits parallel transmission, technical effect can be achieved by outputting one byte of data at clock descending (ascending) edge as well.

When the control color block is a differential signal color block, the differential signal color block is for sampling a first brightness and a second brightness respectively so as to set and output the threshold brightness values for different brightness of a screen at client 1. According to a predetermined method, when the brightness of the output status is higher (lower) than the threshold brightness value, server 2 regards the output status as the first brightness, and when the brightness of the output status is lower (higher) than the threshold brightness value, server 2 regards the output status as the second brightness. The differential signal color block can enable dynamic password device 3 to receive and identify the status of optical signal more correctly in the condition that the screen of client 1 is very dark. In order to distinguish start of data output and completion of data output, server 2 further comprises start instruction and end instruction of output in the blinking process in which a piece of (a set of) data is output via data output color block(s) (in the process that the differential signal color block outputs clock signal) according to a predetermined method. The start instruction represents the starting of output of one byte of data, and data is output after the ending of the start instruction. The end instruction represents the completion of the output of the byte of data. If the data output is in the form of eight digits parallel transmission, technical effect can be achieved by outputting one byte of data when differential signal outputs the threshold brightness value.

In the method, the third information is dynamic impulse optical signal image.

Step 303, client 1 transforms the third information into the impulse optical signal and outputs the impulse optical signal.

In the embodiment, for the first method that client 1 processes the second information in step 302, the first method that client 1 receives the third information and transforms the third information into impulse optical signal and outputs the impulse optical signal specifically includes that: the client controls the output area and outputs different brightness statuses according to the controlling information and transmission bit. For example, when the transmission bit is 1, the output status of client 1 is the first brightness; and when the transmission bit is 0, the output status of client 1 is the second brightness.

Specifically, client 1 outputs the impulse optical signal in two forms.

In the first form, the impulse optical signal contains a single brightness color block only.

The data in the second information is output in the form of serial output. In order to distinguish the start and the completion of the output of every byte of data, a start instruction and an end instruction of output are further included in the blinking process in which client 1 controls the dynamic impulse optical signal image and outputs data in form of serial output. The start instruction represents the starting of output of one byte of data, and data is output after the ending of the start instruction. The end instruction represents the completion of the output of the byte of data.

The start instruction and the end instruction are set according to a method agreed beforehand between client 1 and dynamic password device 3.

In the second form, the impulse optical signal contains a plurality of brightness color blocks.

Client 1 maps the control information, which controls the output of the impulse optical signal, to control color block. In this case, when the control color block is a clock signal color block, the control color block is for controlling the output synchronization of the data output color blocks and controlling (a set of) data to be output at clock ascending(descending) edge. In order to distinguish start of data output and completion of data output, server 2 further comprises start instruction and end instruction of output in the blinking process in which a piece of (a set of) data is output via data output color block(s) (in the process that the clock signal color block outputs clock signal) according to a predetermined method. The start instruction represents the starting of output of one byte of data, and data is output after the ending of the start instruction. The end instruction represents the completion of the output of the byte of data. If the data output is in form of four bits parallel transmission, technical effect can be achieved by outputting high four bits of one byte of data at clock descending (ascending) edge and outputting low four bits at clock ascending (descending) edge. If the data output is in form of eight bits parallel transmission, technical effect can be achieved by outputting one byte of data at clock descending (ascending) edge as well.

When the control color block is a differential signal color block, the differential signal color block is for sampling a first brightness and a second brightness respectively so as to set and output the threshold brightness values for different brightness of a screen at client 1. According to a predetermined method, when the brightness of the output status is higher (lower) than the threshold brightness value, client 1 regards the output status as the first brightness, and when the brightness of the output status is lower (higher) than the threshold brightness value, server 2 regards the output status as the second brightness. The differential signal color block can output an intermediate brightness value in the condition that the screen of client 1 is very dark, to enable dynamic password device 3 to receive and identify the status of optical signal more correctly. In order to distinguish start of data output and completion of data output, client 1 further comprises start instruction and end instruction of output in the blinking process in which a piece of (a set of) data is output via data output color block(s) (in the process that the differential signal color block outputs clock signal) according to a predetermined method. The start instruction represents the starting of output of one byte of data, and data is output after the ending of the start instruction. The end instruction represents the completion of the output of the byte of data. If the data output is in the form of eight digits parallel transmission, technical effect can be achieved by outputting one byte of data when differential signal outputs the threshold brightness value.

It should be noted that, the output color block mapped by client 1 can be in many forms according to different resolutions of the displayer of client 1, so that dynamic password device 3 can receive impulse optical signal at the displayer with different resolutions.

In the embodiment, the first brightness is a little bit lighter and the second brightness is a little bit darker. When the brightness value is higher than the brightness threshold, the brightness is regarded to be the first brightness; and when the brightness value is lower than the darkness threshold, the brightness is regarded to be the second brightness. Alternatively, the first brightness is a little bit darker and the second brightness is a little bit lighter. When the brightness value is higher than the brightness threshold, the brightness is regarded to be the second brightness; and when the brightness value is lower than the darkness threshold, the brightness is regarded to be the first brightness.

As shown in FIG. 9a-9h, the figures indicate different forms of output color blocks. It should be noted that those figures are exemplary only, and the shape of the color blocks of output area are not limited to the figures and can be in any shape;

For the second method by which client 1 processes the second information in step 302, the second method, by which client 1 receives the third information, transforms the third information into impulse optical signal, and outputs the impulse optical signal, specifically includes that: client 1 outputs the dynamic impulse optical signal image to a certain area of the screen of client 1.

It should be noted that the area for displaying the dynamic impulse optical signal image can be random or fixed.

In all the embodiments of the present invention, the form of outputting dynamic impulse optical signal can also be outputting different color brightness in a predetermined area. Different color brightness represents different transmission bit. Dynamic password device 3 identifies different color brightness to obtain the intermediate information according to predetermined method after receiving the dynamic impulse optical signal.

Figure 10:
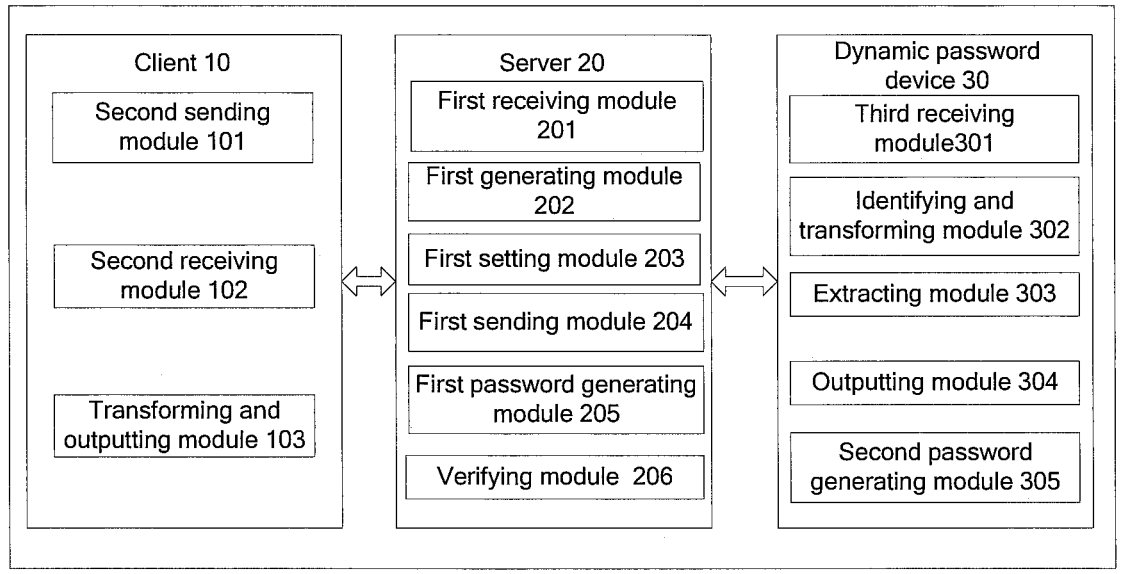
FIG. 10 is a schematic diagram of a dynamic password authentication system according to Embodiment 1 of the present invention.

FIG. 10 is schematic diagram of the dynamic password authentication system according to Embodiment 1 of the present invention. The system includes a server 20, a client 10 and a dynamic password device 30.

Server 20 comprises:

a first receiving module 201, configured to receive a first information and a first dynamic password sent from client 10;

a first generating module 202, configured to generate a second information according to the first information;

a first setting module 203, configured to set every transmission bit in the second information to be in corresponding brightness status or color status to obtain a third information;

a first sending module 204, configured to send the third information in the first setting module 203 to client 10;

a first password generating module 205, configured to generate a second dynamic password or a set of second dynamic passwords according to the second information; and a verifying module 206, configured to verify whether the first dynamic password is legitimate by the second dynamic password or the set of second dynamic passwords.

Client 10 comprises:

a second sending module 101, configured to send the first information and the first dynamic password to server 20;

a second receiving module 102, configured to receive the first information and the first dynamic password; and further to receive the third information sent from server 20; and a transforming and outputting module 103, configured to transform the third information into impulse optical signal, and to output the impulse optical signal.

Dynamic password device 30 comprises:

a third receiving module 301, configured to receive the impulse optical information and a trigger information output by client 10;

an identifying and transforming module 302, configured to identify the impulse optical signal received by the third receiving module 301, and to transform the impulse optical signal into the intermediate information;

an extracting module 303, configured to extract part or all of the intermediate information in the identifying and transforming module 302, and to transform the extracted part or all of the intermediate information into a display information for a user to view;

an outputting module 304, configured to output the display information transformed by the outputting and extracting module and the first dynamic password; and the second password generating module 305, configured to generate the first dynamic password according to the intermediate information.

Figure 11:
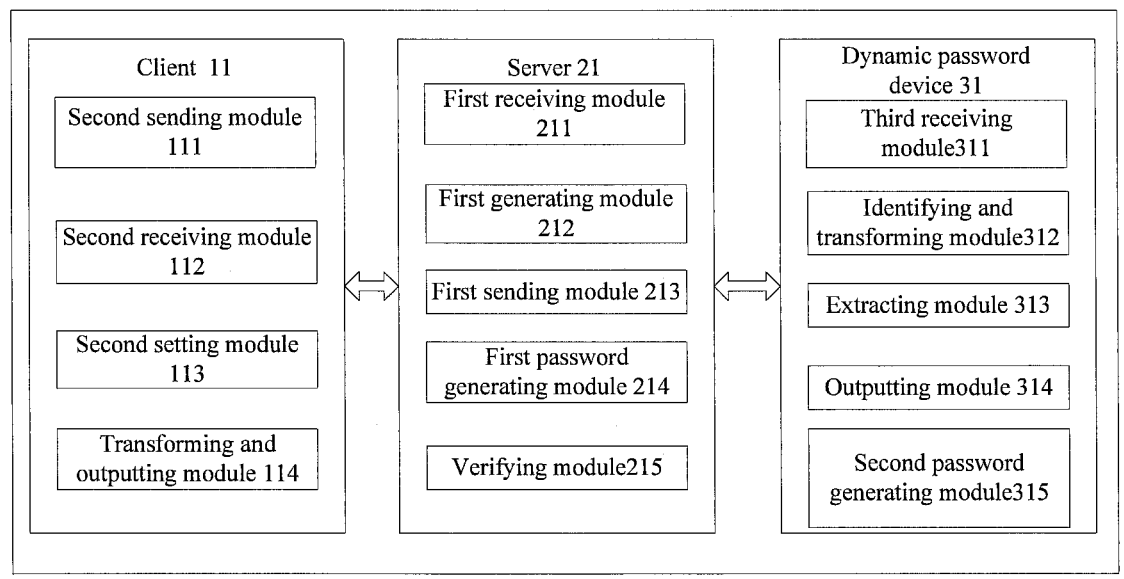
FIG. 11 is a schematic diagram of a dynamic password authentication system according to Embodiment 2 of the present invention.

FIG. 11 is schematic diagram of the dynamic password authentication system according to Embodiment 2 of the present invention. The system comprises a server 21, a client 11 and a dynamic password device 31.

Server 21 comprises:

a first receiving module 211, configured to receive a first information and a first dynamic password sent from client 11;

a first generating module 212, configured to generate a second information according to the first information;

a first sending module 213, configured to send the second information generated by the first generating module 212 to client 11;

a first password generating module 214, configured to generate a second dynamic password or a set of second dynamic passwords according to the second information; and a verifying module 215, configured to verify whether the first dynamic password is legitimate by the second dynamic password or the set of second dynamic passwords.

Client 11 comprises a second sending module 111, configured to send the first information and the first dynamic password to server 21;

a second receiving module 112, configured to receive the first information and the first dynamic password, and further to receive the second information sent by server 21;

a second setting module 113, configured to set every transmission bit in the second information to be in corresponding brightness status or color status to obtain the third information; and a transforming and outputting module 114, configured to transform the third information into impulse optical signal, and to output the impulse optical signal.

Dynamic password device 31 comprises:

a third receiving module 311, configured to receive impulse optical signal and a trigger information output by client 11;

an identifying and transforming module 312, configured to identify the impulse optical signal received by the third receiving module 311, and to transform the impulse optical signal into intermediate information;

an extracting module 313, configured to extract part or all of the intermediate information in the identifying and transforming module 312, and to transform the extracted part or all of the intermediate information into a display information for a user to view;

an outputting module 314, configured to output the display information transformed by the extracting module 313 and the first dynamic password; and a second password generating module 315, configured to generate the first dynamic password according to the intermediate information.

Figure 12:
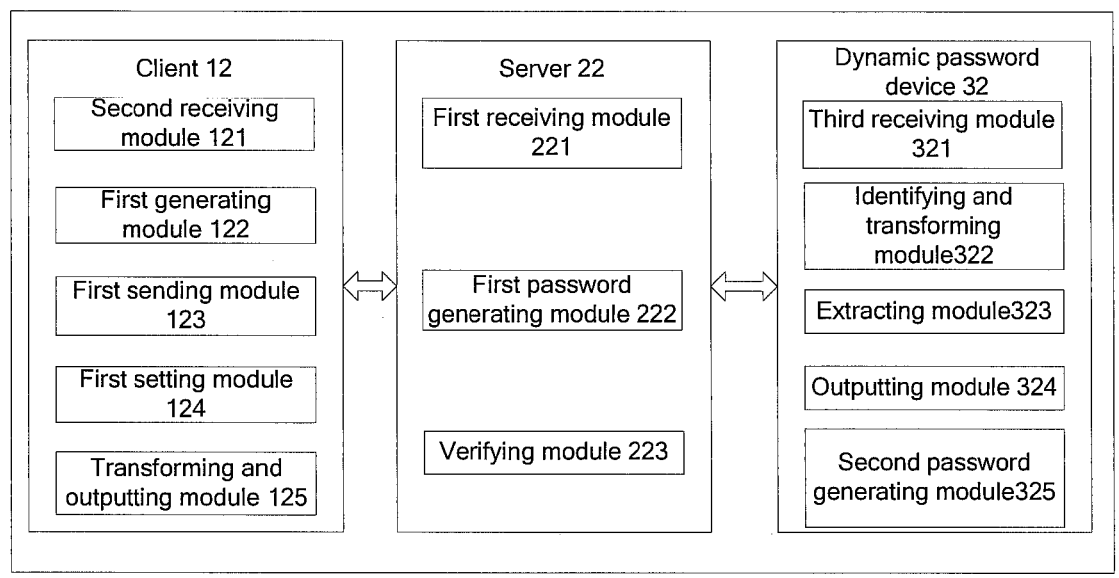
FIG. 12 is a schematic diagram of a dynamic password authentication system according to Embodiment 3 of the present invention.

FIG. 12 is schematic diagram of the dynamic password authentication system according to Embodiment 3 of the present invention, which comprises a server 22, a client 12 and a dynamic password device 32.

Server 22 comprises:

a first receiving module 221, configured to receive a first dynamic password sent by client 12 and a second information;

a first password generating module 222, configured to generate a second dynamic password or a set of second dynamic passwords according to the second information; and a verifying module 223, configured to verify whether the first dynamic password is legitimate by the second dynamic password or the set of second dynamic passwords.

Client 12 comprises:

a second receiving module 121, configured to receive the first information and the first dynamic password;

a first generating module 122, configured to generate the second information according to the first information;

a first sending module 123, configured to send the second information and the first dynamic password to server 22;

a first setting module 124, configured to set every transmission bit in the second information to be in corresponding brightness or color status to obtain the third information; and a transforming and outputting module 125, configured to transform the third information into impulse optical signal, and to output the impulse optical signal.

Dynamic password device 32 comprises:

a third receiving module 321, configured to receive impulse optical signal and a trigger information;

an identifying and transforming module 322, configured to identify the impulse optical signal received by the third receiving module 321, and to transform the impulse optical signal into intermediate information;

an extracting module 323, configured to extract part or all of the intermediate information in the identifying and transforming module 322, and to transform the extracted part or all of the intermediate information into a display information for user to view;

an outputting module 324, configured to output the display information transformed by the extracting module 323 and the first dynamic password; and a second password generating module 325, configured to generate the first dynamic password according to the intermediate information.

It should be noted that the steps shown by the flow charts of the drawings can be performed in a computer system with a set of computer executable instructions. In addition, though logic sequence is shown in the flow charts, in some cases, the shown or described steps can be performed in a different sequence.

From the description above, it can be seen that the following technical effect is achieved by the present invention: by adapting a transmission method without wired connection, related user information is transmitted to dynamic password device 3, which omits the step of manual input in the related art, increases transmission efficiency of a large quantity of data, and improves security.

Obviously, those skilled in the art should appreciate and understand that the modules and steps of the present invention described above can be implemented by a general computing device. They can be integrated on a single computing device or distributed on a network made up by a plurality of computing devices. Optionally, they can be implemented by executable program code of a computing device in such a way that they can be stored in a storage device and performed by the computing device, or they can be made into integrated circuit module respectively, or a plurality of modules or steps of them can be made into a single integrated circuit module. In such way, the present invention is not limit to combination of specific hardware and software.

Above description is only to illustrate the preferred embodiments but not to limit the present invention. To those skilled in the art, various alterations and changes can be made to the present invention. The scope defined in claims shall comprise any modification, equivalent substitution and improvement within the spirit and principle of the present invention.

What is claimed is:

1. A dynamic password authentication method, comprising
    a server receiving first information sent by a client, and generating second information according to the first information;
    the server setting every transmission bit in the second information to be in corresponding brightness status or color status to obtain third information, and sending the third information to the client, wherein the third information comprises blinking information of impulse optical signal or image information of dynamic impulse optical signal;
    the client transforming the third information into an impulse optical signal and outputting the impulse optical signal;
    a dynamic password device receiving and identifying the impulse optical signal, transforming the impulse optical signal into intermediate information, extracting part or all of the intermediate information, transforming the part or all of the intermediate information into display information for a user to view, and outputting the display information;
    the dynamic password device receiving trigger information, and generating a first dynamic password according to the intermediate information;
    the client receiving the first dynamic password input by the user, and sending the first dynamic password to the server; and
    the server generating a second dynamic password or a set of second dynamic passwords, and verifying whether the first dynamic password is legitimate by the second dynamic password or the set of second dynamic passwords;
    if the first dynamic password is identical to the second dynamic password or any second dynamic password in the set of second dynamic passwords, verifying the first dynamic password to be legitimate; and
    if the first dynamic password is not identical to the second dynamic password or any second dynamic password in the set of second dynamic passwords, verifying the first dynamic password to be illegitimate;
    the server performing a user operation if the first dynamic password is correct.

2. The method according to claim 1, wherein the server setting the every transmission bit in the second information to be in the corresponding brightness status or color status to obtain the third information comprises
    the server controlling the brightness status or the color status of the every transmission bit in the second information in a predetermined area according to a control signal to obtain the blinking information of impulse optical signal; or the server controlling the brightness status or the color status of the every transmission bit in the second information in different areas according to a control signal to obtain the image information of dynamic impulse optical signal.

3. The method according to claim 2, wherein the dynamic password device receiving and identifying the impulse optical signal, and transforming the impulse optical signal into intermediate information comprises
    A. acquiring the impulse optical signal in a predetermined outputting area;
    B. receiving and identifying a byte of data in the impulse optical signal;
    C. determining whether the byte of data is header information;
    if the byte of data is header information, performing D; and
    if the byte of data is not header information, going back to B;
    D. receiving and identifying the impulse optical signal representing a predetermined number of bytes of data after the header information, and transforming and combining the header information and the predetermined number of bytes of data to obtain a set of combined intermediate information; and
    E. after receiving all of the combined intermediate information, combining all of the combined intermediate information to generate the intermediate information.

4. The method according to claim 3, wherein before combining all of the intermediate information to generate the intermediate information, the method further comprises
    the dynamic password device determining whether all of the received combined intermediate information is correct in a predetermined time;
        if the all of the received combined intermediate information is determined to be correct in the predetermined time, combining all of the combined intermediate information to generate the intermediate information; and
        if any information in the all of the received combined intermediate information is determined to be incorrect in the predetermined time, the dynamic password device outputting a message of error,
    wherein the dynamic password device determining whether all of the received combined intermediate information is correct in the predetermined time comprises
        the dynamic password device determining whether the received combined intermediate information is correct;
        if the combined intermediate information is correct, the dynamic password device determining whether all of the combined intermediate information which is determined to be correct is received;
            if all of the combined intermediate information which is determined to be correct is received, the dynamic password device combining all of the combined information which is determined to be correct; and
            if all the combined intermediate information which is determined to be correct is not received, going back to B; and
        if the combined intermediate information is not correct, determining whether the predetermined time is reached, if the predetermined time is reached, the dynamic password device outputting a message of error; and if the predetermined time is not reached, going back to B.

5. The method according to claim 2, wherein the dynamic password device receiving and identifying the impulse optical signal, and transforming the impulse optical signal into intermediate information comprises acquiring the impulse optical signal in a predetermined outputting area;

receiving and identifying all bytes of data in the impulse optical signal;

combining all bytes of data representing the header information and a predetermined number of bytes of data after the header information to obtain all of the combined intermediate information; and combining the all of the combined intermediate information to generate the intermediate information.

6. The method according to claim 5, wherein before combining all of the combined intermediate information to generate the intermediate information, the method further comprises the dynamic password device determining whether all of the received combined intermediate information is correct in a predetermined time;

if the all of the received combined intermediate information is determined to be correct in the predetermined time, combining all of the combined intermediate information to generate the intermediate information; and if any information in the all of the received combined intermediate information is determined to be incorrect in the predetermined time, the dynamic password device outputting a message of error, wherein the dynamic password device determining whether all of the received combined intermediate information is correct in the predetermined time comprises a. determining whether all of the combined intermediate information is correct one by one;

if every set of the combined intermediate information is correct, performing b; and if at least one set of the combined intermediate information is incorrect, performing c;

b. the dynamic password device combining the all of the combined intermediate information to generate the intermediate information; and c. the dynamic password device determining whether the predetermined time is reached; if the predetermined time is reached, outputting a message of error; and if the predetermined time is not reached, continuing receiving the combined intermediate information which has not been determined, and performing a.

7. A dynamic password authentication method, comprising:

a server receiving first information sent by a client, and generating second information according to the first information the server sending the second information to the client; and the client receiving the second information and setting every transmission bit in the second information to be in corresponding brightness status or color status to obtain third information, wherein the third information comprises blinking information of impulse optical signal or image information of dynamic impulse optical signal;

the client transforming the third information into an impulse optical signal and outputting the impulse optical signal;

a dynamic password device receiving and identifying the impulse optical signal, transforming the impulse optical signal into intermediate information, extracting part or all of the intermediate information, transforming the part or all of the intermediate information into display information for a user to view, and outputting the display information;

the dynamic password device receiving trigger information, and generating a first dynamic password according to the intermediate information;

the client receiving the first dynamic password input by the user, and sending the first dynamic password to the server; and the server generating a second dynamic password or a set of second dynamic passwords according to the second information, and verifying whether the first dynamic password is legitimate by the second dynamic password or the set of second dynamic passwords;

if the first dynamic password is identical to the second dynamic password or any second dynamic password in the set of second dynamic passwords, verifying the first dynamic password to be legitimate; and if the first dynamic password is not identical to the second dynamic password or any second dynamic password in the set of second dynamic passwords, verifying the first dynamic password to be illegitimate;

the server performing a user operation if the first dynamic password is correct.

8. The method according to claim 7, wherein the client receiving the second information and setting the every transmission bit in the second information to be the corresponding brightness status or color status to obtain the third information comprises after receiving the second information, the client controlling the brightness status or the color status of the every transmission bit in the second information in a predetermined area according to a control signal to obtain the blinking information of impulse optical signal; or after receiving the second information, the client controlling the brightness status or the color status of the every transmission bit in the second information in different areas according to a control signal to obtain the image information of dynamic impulse optical signal.

9. The method according to claim 8, wherein the dynamic password device receiving and identifying the impulse optical signal and transforming the impulse optical signal into the intermediate information comprises A. acquiring the impulse optical signal in a predetermined area;

B. receiving and identifying a byte of data in the impulse optical signal;

C. determining whether the byte of data is header information;

if the byte of data is header information, performing D; and if the byte of data is not header information, going back to B;

D. receiving and identifying impulse optical signal representing a predetermined number of bytes of data after the header information, and transforming and combining the header information and the predetermined number of the bytes of data to obtain a set of combined intermediate information; and E. after receiving all of the combined intermediate information, combining the all of the combined intermediate information to generate the intermediate information.

10. The method according to claim 9, wherein before combining all of the intermediate information to generate the intermediate information, the method further comprises the dynamic password device determining whether all of the received combined intermediate information is correct in a predetermined time;
if the all of the received combined intermediate information is determined to be correct in the predetermined time, combining all of the combined intermediate information to generate the intermediate information; and
if any information in the all of the received intermediate information is determined to be incorrect in a predetermined time, the dynamic password device outputting a message of error,
wherein the dynamic password device determining whether all of the received combined intermediate information is correct in a predetermined time comprises
the dynamic password device determining whether the received combined intermediate information is correct;
if the combined intermediate information is correct, the dynamic password device determining whether all of the combined intermediate information which is determined to be correct is received;
if the all of the combined intermediate information which is determined to be correct is received, the dynamic password device combining all of the combined information which is determined to be correct; and
if not all of the combined intermediate information which is determined to be correct is received, going back to B; and
if the combined intermediate information is not correct, determining whether the predetermined time is reached; if the predetermined time is reached, the dynamic password device outputting a message of error; and if the predetermined time is not reached, going back to B.

11. The method according to claim 8, wherein the dynamic password device receiving and identifying the impulse optical signal and transforming the impulse optical signal into the intermediate information comprises acquiring the impulse optical signal in a predetermined area;
receiving and identifying all bytes of data in the impulse optical signal;
combining the byte of data representing the header information and a predetermined number of bytes of data after the header information to obtain all of the combined intermediate information; and
combining the all of the combined intermediate information to generate the intermediate information.

12. The method according to claim 11, wherein before combining all of the combined intermediate information to generate the intermediate information, the method comprises the dynamic password device determining whether all of the received combined intermediate information is correct in a predetermined time;
if the all of the received combined intermediate information is determined to be correct in the predetermined time, combining all of the combined intermediate information to generate the intermediate information; and
if any information in the all of the received combined intermediate information is determined to be incorrect in the predetermined time, the dynamic password device outputting a message of error,
wherein the dynamic password device determining whether all of the received combined intermediate information is correct in the predetermined time comprises
a. determining, whether all of the combined intermediate information is correct one by one;
if every set of combined intermediate information is correct, performing b; and
if at least one set of the combined intermediate information is incorrect, performing c;
b. the dynamic password device combining the all of the received combined intermediate information to generate the intermediate information; and
c. the dynamic password device determining whether the predetermined time is reached; if the predetermined time is reached, outputting a message of error; and if the predetermined time is not reached, continuing receiving the combined intermediate information which has not been determined, and performing a.

13. A dynamic password authentication method, comprising a client receiving first information and generating second information according to the first information;
the client setting every transmission bit in the second information to be in corresponding brightness status or color status to obtain third information, wherein the third information comprises blinking information of impulse optical signal or image information of dynamic impulse optical signal;
the client transforming the third information into an impulse optical signal, and outputting the impulse optical signal;
a dynamic password device receiving the impulse optical signal, transforming the impulse optical signal into intermediate information, extracting part or all of the intermediate information, transforming the part or all of the intermediate information into display information for a user to view, and outputting the display information;
the dynamic password device receiving trigger information, and generating a first dynamic password according to the intermediate information;
the client receiving the first dynamic password input by the user, and sending the first dynamic password and the second information to the server;
the server generating a second dynamic password or a set of second dynamic passwords, and verifying whether the first dynamic password is legitimate by the second dynamic password or the set of second dynamic passwords;
if the first dynamic password is identical to the second dynamic password or any second dynamic password in the set of the second dynamic passwords, verifying the first dynamic password to be legitimate; and
if the first dynamic password is not identical to the second dynamic password or any second dynamic password in the set of the second dynamic passwords, verifying the first dynamic password to be illegitimate;
the server performing a user operation if the first dynamic password is correct.

14. The method according to claim 13, wherein the client setting every transmission bit in the second information to be in corresponding brightness status or color status to obtain the third information comprises the client controlling the brightness status or the color status of the every transmission bit in the second information in a predetermined area according to a control signal to obtain the blinking information of impulse optical signal; or the client controlling the brightness status or the color status of the every transmission bit in the second information in different areas according to a control signal to obtain the image information of dynamic impulse optical signal.

15. The method according to claim 14, wherein the dynamic password device receiving the impulse optical signal and transforming the impulse optical signal into the intermediate information comprises A'. acquiring the impulse optical signal in a predetermined area;

B'. receiving and identifying a byte of data in the impulse optical signal;

C'. determining whether the byte of data is header information;

if the byte of data is header information, performing D';

if the byte of data is not header information, going back to B';

D'. receiving and identifying impulse optical signal representing a predetermined number of bytes of data after the header information, transforming and combining the header information and the predetermined number of the bytes of data to obtain a set of combined intermediate information; and E'. after receiving all of the combined intermediate information, combining the all of the combined intermediate information to generate the intermediate information.

16. The method according to claim 15, wherein before combining all of the combined intermediate information to generate the intermediate information, the method further comprises the dynamic password device determining whether all of the received combined intermediate information is correct in a predetermined time;
if the all of the received combined intermediate information is determined to be correct in the predetermined time, combining all of the combined intermediate information to generate the intermediate information; and
if any information in the all of the received intermediate information is determined to be incorrect in the predetermined time, the dynamic password device outputting a message of error,
wherein the dynamic password device determining whether all of the received combined intermediate information is correct in the predetermined time comprises
the dynamic password device determining whether the received combined intermediate information is correct;
if the combined intermediate information is correct, the dynamic password device determining whether all of the combined intermediate information which is determined to be correct is received;
if all of the combined intermediate information which is determined to be correct is received, the dynamic password device combining all of the combined intermediate information which is determined to be correct; and
if not all of the combined intermediate information which is determined to be correct is received, going back to B'; and
if the combined intermediate information is not correct, determining whether the predetermined time is reached; if the predetermined time is reached, the dynamic password device outputting a message of error; and if the predetermined time is not reached, going back to B'.

17. The method according to claim 14, wherein the dynamic password device receiving the impulse optical signal and transforming the impulse optical signal into the intermediate information comprises acquiring the impulse optical signal in a predetermined area;

receiving and identifying all bytes of data in the impulse optical signal;

combining the byte of data representing header information and a predetermined number of bytes of data after the header information to obtain all of the combined intermediate information; and combining the all of the combined intermediate information to generate the intermediate information.

18. The method according to claim 17, wherein before combining all of the combined intermediate information to generate the intermediate information, the method further comprises the dynamic password device determining whether all of the received combined intermediate information is correct in a predetermined time;
if the all of the received combined intermediate information is determined to be correct in the predetermined time, combining all of the combined intermediate information to generate the intermediate information; and
if any information in the all of the received combined intermediate information is determined to be incorrect in the predetermined time, the dynamic password device outputting a message of error,
wherein the dynamic password device determining whether all of the received combined intermediate information is determined to be correct in the predetermined time comprises
a'. the dynamic password device determining whether all of the combined intermediate information is correct one by one;
if every set of the combined intermediate information is correct, performing b'; and
if at least one set of the combined intermediate information is incorrect, performing c';
b'. the dynamic password device combining the all of the received combined intermediate information to generate the combined intermediate information; and
c'. the dynamic password device determining whether the predetermined time is reached; if the predetermined time is reached, outputting a message of error; and if the predetermined time is not reached, continuing receiving the rest of the combined intermediate information which has not been determined, and performing a'.

19. A dynamic password authentication system, comprising a server, a client and a dynamic password device, wherein
the server is configured to receive first information and a first dynamic password sent from the client, generate second information according to the first information, set every transmission bit in the second information to be in corresponding brightness status and color status to obtain third information, and send the third information to the client; and generate a second dynamic password or a set of second dynamic passwords according to the second information and verify whether the first dynamic password is legitimate by the second dynamic password or the set of second dynamic passwords;

the client is configured to send the first information and the first dynamic password to the server, receiving the third information sent by the server, transform the third information into an impulse optical signal, and output the impulse optical signal;

the dynamic password device is configured to receive the impulse optical signal and trigger information output by the client, identify the impulse optical signal and transform the impulse optical signal into intermediate information, and generate the first dynamic password according to the intermediate information;

and after extracting part or all of the intermediate information, transform the extracted information into display information for a user to view, and output the display information transformed by an extraction module and the first dynamic password; and the server is also configured to perform a user operation if the first dynamic password is correct.

20. A dynamic password authentication system, comprising a server, a client and a dynamic password device; wherein the server is configured to receive first information and a first dynamic password sent from the client, generate second information according to the first information, generate a second dynamic password or a set of second dynamic passwords according to the second information, verify whether the first dynamic password is legitimate by the second dynamic password or the set of second dynamic passwords, and send the second information to the client;

the client is configured to send the first information and the first dynamic password to the server, receive the second information sent by the server, set every transmission bit in the second information to be in corresponding brightness status or color status to obtain third information, transform the third information into an impulse optical signal, and output the impulse optical signal;

the dynamic password device is configured to receive the impulse optical signal and trigger information output from the client, identify and transform the impulse optical signal into intermediate information, and generate the first dynamic password according to the intermediate information; and after extracting part or all of the intermediate information, transform the extracted information into display information for a user to view, and output the display information transformed by an extraction module and the first dynamic password; and the server is also configured to perform a user operation if the first dynamic password is correct.

21. A dynamic password authentication system, comprising a server, a client and a dynamic password device; wherein the server is configured to receive a first dynamic password and second information sent from the client, generate a second dynamic password or a set of second dynamic passwords according to the second information, and verify whether the first dynamic password is legitimate by the second dynamic password or the set of dynamic passwords;

the client is configured to receive first information and the first dynamic password input by the user, generate the second information according to the first information, send the second information and the first dynamic password to the server, set every transmission bit in the second information to be in corresponding brightness status or color status to obtain third information, and then transform the third information into an impulse optical signal and output the impulse optical signal; and the dynamic password device is configured to receive the impulse optical signal and trigger information, identify and transform the received impulse optical signal into intermediate information, and generate the first dynamic password according to the intermediate information; and after extracting part or all of the intermediate information, transform the extracted information into display information for a user to view, and output the display information transformed by an extraction module and the first dynamic password; and the server is also configured to perform a user operation if the first dynamic password is correct.

* * * * *